(12) United States Patent
Inoue

(10) Patent No.: US 12,057,762 B2
(45) Date of Patent: Aug. 6, 2024

(54) VEHICLE DRIVE DEVICE

(71) Applicant: AISIN CORPORATION, Aichi (JP)

(72) Inventor: Ryohei Inoue, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/766,386

(22) PCT Filed: Sep. 29, 2020

(86) PCT No.: PCT/JP2020/036901
§ 371 (c)(1),
(2) Date: Apr. 4, 2022

(87) PCT Pub. No.: WO2021/095380
PCT Pub. Date: May 20, 2021

(65) Prior Publication Data
US 2024/0051378 A1    Feb. 15, 2024

(30) Foreign Application Priority Data

Nov. 14, 2019  (JP) ................................ 2019-206356
Feb. 28, 2020  (JP) ................................ 2020-034283

(51) Int. Cl.
*H02K 9/19*       (2006.01)
*B60K 1/00*       (2006.01)
(Continued)

(52) U.S. Cl.
CPC ............. *H02K 9/19* (2013.01); *B60K 1/00* (2013.01); *B60K 17/165* (2013.01);
(Continued)

(58) Field of Classification Search
CPC .. B60K 2001/001; H02K 5/203; H02K 7/116; H02K 9/19; F16H 57/021; F16H 57/037
See application file for complete search history.

(56) References Cited

U.S. PATENT DOCUMENTS 9,539,890 B2 *  1/2017  Miyazawa ............. B60K 6/405
9,849,791 B2 * 12/2017  Suzuki .................... B60L 1/003
(Continued)

FOREIGN PATENT DOCUMENTS

JP   2019-094932 A   6/2019
WO  2014/192394 A1  12/2014

OTHER PUBLICATIONS

Dec. 8, 2020 International Search Report issued in International Patent Application No. PCT/JP2020036901.

*Primary Examiner* — Huan Le
(74) *Attorney, Agent, or Firm* — Oliff PLC

(57) ABSTRACT

An input member and a differential gear mechanism include a part arranged on an axial first side with respect to a rotary electric machine. The differential gear mechanism is connected to first wheel via shaft member including part that is arranged on axial second side with respect to differential gear mechanism. A case includes an outer peripheral support portion that is formed along core outer peripheral surface that is an outer peripheral surface of stator core, and that supports core outer peripheral surface in radial direction. A notch portion in which outer peripheral support portion is notched over entire area of arrangement area of stator core in an axial direction is formed in outer peripheral support portion, and notch portion is arranged at position that is between core outer peripheral surface and shaft member in radial direction, and that overlaps shaft member as seen in radial direction along radial direction.

20 Claims, 6 Drawing Sheets

(51) Int. Cl.
   *B60K 17/16*    (2006.01)
   *F16H 57/02*    (2012.01)
   *F16H 57/021*   (2012.01)
   *F16H 57/037*   (2012.01)
   *H02K 5/20*     (2006.01)
   *H02K 7/116*    (2006.01)

(52) U.S. Cl.
   CPC ......... *F16H 57/021* (2013.01); *F16H 57/037* (2013.01); *H02K 5/203* (2021.01); *H02K 7/116* (2013.01); *B60K 2001/001* (2013.01); *B60K 2001/006* (2013.01); *F16H 2057/02034* (2013.01); *F16H 2057/02052* (2013.01)

(56) References Cited

U.S. PATENT DOCUMENTS

| | | | |
|---|---|---|---|
| 11,465,488 B2 * | 10/2022 | Li | ............ B60K 17/043 |
| 2015/0251531 A1 | 9/2015 | Hotta et al. | |
| 2016/0039276 A1 | 2/2016 | Takahashi et al. | |
| 2020/0278020 A1 * | 9/2020 | Inoue | ............ F16H 57/021 |

\* cited by examiner

VEHICLE DRIVE DEVICE

TECHNICAL FIELD

The present disclosure relates to a vehicle drive device including: a rotary electric machine including a stator on an outer side of a rotor in a radial direction; an input member drivingly connected to the rotor; a differential gear mechanism in which a drive force from the rotary electric machine that is transmitted via the input member is distributed to a first wheel and a second wheel; and a case that accommodates the rotary electric machine, the input member, and the differential gear mechanism.

BACKGROUND ART

An example of such a vehicle drive device is disclosed in Japanese Unexamined Patent Application Publication No. 2019-94932 (JP 2019-94932 A) (Patent Document 1). Hereinafter, the reference numerals shown in parentheses in the description of the background art and the problem are those of Patent Document 1. A vehicle drive device (100) of Patent Document 1 includes: a rotary electric machine (1) including a stator (11) on an outer side of a rotor (12) in a radial direction (R); an input member (2) drivingly connected to the rotor (12); a differential gear mechanism (4) in which a drive force from the rotary electric machine (1) that is transmitted via the input member (2) is distributed to a first wheel and a second wheel; and a case (5) for accommodating these. In the vehicle drive device (100) of Patent Document 1, the case (5) is downsized and the manufacturing cost is reduced by reducing the number of divisions of a peripheral wall portion (51) of the case (5).

RELATED ART DOCUMENTS

Patent Documents

Patent Document 1: Japanese Unexamined Patent Application Publication No. 2019-94932 (JP 2019-94932 A)

SUMMARY OF THE DISCLOSURE

Problem to be Solved by the Invention

By the way, paragraph 0055 of Patent Document 1 describes that by arranging a differential gear mechanism (differential gear device (4) in Patent Document 1) so as not to overlap with the rotary electric machine as seen in the radial direction, the axis on which the rotary electric machine is arranged and the axis on which the differential gear mechanism is arranged are arranged so as to be close to each other, and the size of the case is reduced in this way. Since the inter-axial distance between the axis on which the rotary electric machine is arranged and the axis on which the differential gear mechanism is arranged tends to have a large effect on the size of the case as seen in the axial direction, suppressing this inter-axial distance is important in reducing the size of the dimensions of the case as seen in the axial direction.

Thus, it is desired to realize a technique that makes it easy to keep an inter-axial distance between an axis on which a rotary electric machine is arranged and an axis on which a differential gear mechanism is arranged short.

Means for Solving the Problem

As one aspect, a vehicle drive device includes: a rotary electric machine including a stator on an outer side of a rotor in a radial direction; an input member drivingly connected to the rotor; a differential gear mechanism in which a drive force from the rotary electric machine that is transmitted via the input member is distributed to a first wheel and a second wheel; and a case that accommodates the rotary electric machine, the input member, and the differential gear mechanism, in which the rotary electric machine and the input member are arranged on a first axis, the differential gear mechanism is arranged on a second axis different from the first axis, the input member and the differential gear mechanism include a part arranged on an axial first side that is one side in an axial direction with respect to the rotary electric machine, an opposite side in the axial direction from the axial first side is set as an axial second side, the differential gear mechanism is connected to the first wheel via a shaft member including a part that is arranged on the second axis on the axial second side with respect to the differential gear mechanism, the case includes an outer peripheral support portion that is formed along a core outer peripheral surface that is an outer peripheral surface of a stator core included in the stator, and that supports the core outer peripheral surface in the radial direction, a notch portion in which the outer peripheral support portion is notched over an entire area of an arrangement area of the stator core in the axial direction is formed in the outer peripheral support portion, and the notch portion is arranged at a position that is between the core outer peripheral surface and the shaft member in the radial direction, and that overlaps the shaft member as seen in the radial direction along the radial direction.

In this configuration, since each of the input member and the differential gear mechanism includes a part arranged on the axial first side with respect to the rotary electric machine, a power transmission mechanism that transmits a drive force between the input member and the differential gear mechanism can be arranged in a space on the axial first side with respect to the rotary electric machine. Since the differential gear mechanism includes a part arranged on the axial first side with respect to the rotary electric machine, by arranging the differential gear mechanism closer to the axial first side, it is easy to avoid that an interference between the differential gear mechanism and the rotary electric machine hinders the shortening of an inter-axial distance between the first axis in which the rotary electric machine is arranged and the second axis in which the differential gear mechanism is arranged.

Further, in the present configuration, since the case includes the outer peripheral support portion, the stator core can be supported by the outer peripheral support portion. Thereby, for example, centering at the time of assembling the stator core can be appropriately performed, and even if the stator core fixed to the case is tilted, the amount of tilt can be suppressed to a small value. Alternatively, when the outer peripheral support portion is configured to be in constant contact with the core outer peripheral surface, the stator core can be appropriately held. In the present configuration, the notch portion formed in the outer peripheral support portion is arranged at a position that is between the core outer peripheral surface and the shaft member in the radial direction and that overlaps the shaft member as seen in the radial direction. Thus, it is easy to arrange the core outer peripheral surface closer to the shaft member in the radial direction while providing the outer peripheral support portion, and it is easy to keep the inter-axial distance between the first axis and the second axis short. Thus, according to the present configuration, it is easy to reduce the size of the dimensions of the vehicle drive device in the radial direction. By keeping the distance between the first axis and the second axis short in this way, it is possible to reduce the size of the case as seen in the axial direction and also reduce the weight of the case.

As one different aspect, a vehicle drive device includes: a rotary electric machine including a stator on an outer side of a rotor in a radial direction; an input member drivingly connected to the rotor; a differential gear mechanism in which a drive force from the rotary electric machine that is transmitted via the input member is distributed to a first wheel and a second wheel; and a case that accommodates the rotary electric machine, the input member, and the differential gear mechanism, in which the rotary electric machine and the input member are arranged on a first axis, the differential gear mechanism is arranged on a second axis different from the first axis, the input member and the differential gear mechanism include a part arranged on an axial first side that is one side in an axial direction with respect to the rotary electric machine, an opposite side in the axial direction from the axial first side is set as an axial second side, the differential gear mechanism is connected to the first wheel via a shaft member including a part that is arranged on the second axis on the axial second side with respect to the differential gear mechanism, the case includes an outer peripheral support portion that is formed along a core outer peripheral surface that is an outer peripheral surface of a stator core included in the stator, and that supports the core outer peripheral surface in the radial direction, the outer peripheral support portion is provided with an inner case that has a tubular inner peripheral surface surrounding the stator core from the outer side in the radial direction and that is externally fitted to the stator core, an outer case that is externally fitted to the inner case, and a flow passage that is formed between the inner case and the outer case and through which the coolant flows, a notch portion in which the outer case is notched over an entire area of an arrangement area of the stator core in the axial direction is formed, and the notch portion is arranged at a position that is between the core outer peripheral surface and the shaft member in the radial direction, and that overlaps the shaft member as seen in the radial direction along the radial direction.

In this configuration, since each of the input member and the differential gear mechanism includes a part arranged on the axial first side with respect to the rotary electric machine, a power transmission mechanism that transmits a drive force between the input member and the differential gear mechanism can be arranged in a space on the axial first side with respect to the rotary electric machine. Since the differential gear mechanism includes a part arranged on the axial first side with respect to a rotary electric machine, by arranging the differential gear mechanism closer to the axial first side, it is easy to avoid that an interference between the differential gear mechanism and the rotary electric machine hinders the shortening of an inter-axial distance between the first axis in which the rotary electric machine is arranged and the second axis in which the differential gear mechanism is arranged.

Further, in the present configuration, since the case includes the outer peripheral support portion, the stator core can be supported by the outer peripheral support portion. Thereby, for example, centering at the time of assembling the stator core can be appropriately performed, and even if the stator core fixed to the case is tilted, the amount of tilt can be suppressed to a small value. Alternatively, when the outer peripheral support portion is configured to be in constant contact with the core outer peripheral surface, the stator core can be appropriately held. In the present configuration, the notch portion formed in the outer case is arranged at a position that is between the core outer peripheral surface and the shaft member in the radial direction and that overlaps the shaft member as seen in the radial direction. Thus, while using a support portion having a configuration in which a flow passage through which the coolant flows is formed between the inner case and the outer case, the core outer peripheral surface and the shaft member are arranged so as to be close to each other in the radial direction. It is easy to keep the distance between the first axis and the second axis short. Thus, according to the present configuration, it is easy to reduce the size of the radial dimension of the vehicle drive device. By keeping the distance between the first axis and the second axis short in this way, it is possible to reduce the size of the case as seen in the axial direction and also reduce the weight of the case.

As one further different aspect, a vehicle drive device includes: a rotary electric machine including a stator on an outer side of a rotor in a radial direction; an input member drivingly connected to the rotor; a differential gear mechanism in which a drive force from the rotary electric machine that is transmitted via the input member is distributed to a first wheel and a second wheel; and a case that accommodates the rotary electric machine, the input member, and the differential gear mechanism, in which the rotary electric machine and the input member are arranged on a first axis, the differential gear mechanism is arranged on a second axis different from the first axis, the input member and the differential gear mechanism include a part arranged on an axial first side that is one side in an axial direction with respect to the rotary electric machine, an opposite side in the axial direction from the axial first side is set as an axial second side, the differential gear mechanism is connected to the first wheel via a shaft member including a part that is arranged on the second axis on the axial second side with respect to the differential gear mechanism, the stator core provided in the stator includes a main body portion that extends in the axial direction and that has a cylindrical shape, and a plurality of protruding portions protruding to an outer side in the radial direction with respect to the main body portion, the protruding portions are arranged so as to be dispersed in a circumferential direction along an outer peripheral surface of the main body portion, and are each fixed to a fixing portion formed in the case, and at least a part of the shaft member is arranged on an inner side in the radial direction with respect to a virtual circle passing through an outer side end of each of the protruding portions in the radial direction, as seen in the axial direction along the axial direction.

In this configuration, since each of the input member and the differential gear mechanism includes a part arranged on the axial first side with respect to the rotary electric machine, a power transmission mechanism that transmits a drive force between the input member and the differential gear mechanism can be arranged in a space on the axial first side with respect to the rotary electric machine. Since the differential gear mechanism includes a part arranged on the axial first side with respect to a rotary electric machine, by arranging the differential gear mechanism closer to the axial first side, it is easy to avoid that an interference between the differential gear mechanism and the rotary electric machine hinders the shortening of an inter-axial distance between the first axis in which the rotary electric machine is arranged and the second axis in which the differential gear mechanism is arranged.

Further, in the present configuration, at least a part of the shaft member is arranged on the inner side in the radial direction with respect to the virtual circle passing through the outer side end of each of the protruding portions in the radial direction, as seen in the axial direction. Thus, while providing the protruding portions for fixing the stator core to the case, by arranging the core outer peripheral surface and the shaft member closer in the radial direction to a degree in which at least a part of the shaft member is arranged on the inner side in the radial direction with respect to the virtual circle as seen in the axial direction, the inter-axial distance between the first axis and the second axis can be kept short. Thus, according to the present configuration, it is easy to reduce the size of the radial dimension of the vehicle drive device. By keeping the distance between the first axis and the second axis short in this way, it is possible to reduce the size of the case in the axial direction and also reduce the weight of the case.

Further features and advantages of the vehicle drive device will be clarified from the following description of the embodiments described with reference to the drawings.

MODES FOR CARRYING OUT THE DISCLOSURE

First Embodiment

A first embodiment of a vehicle drive device will be described with reference to the drawings (FIGS. 1 to 4). The direction of each member in the following description represents a direction of the member that is assembled to the vehicle drive device. Terms related to the dimension, the arrangement direction, the arrangement position, and the like of each member represent concepts that include a state in which there is a difference due to an error (error to an extent that is allowed in manufacturing).

In the present specification, "drivingly connected" refers to a state in which two rotation elements are connected so that a drive force (synonymous with torque) can be transmitted, and includes a state in which the two rotation elements are connected so as to rotate integrally or a state in which the two rotation elements are connected so as to be able to transmit a drive force via one or two or more transmitting members. Such transmitting members include various members that transmit rotation at the same speed or at a changed speed (for example, a shaft, a gear mechanism, a belt, a chain, and the like), and may include an engagement device that selectively transmits rotation and drive force (for example, a friction engagement device, a meshing type engagement device, and the like).

In the present specification, "the rotary electric machine" is used as a concept including any of a motor (electric motor), a generator (power generator), and a motor generator that functions as both a motor and a generator as necessary. Further, in the present specification, regarding the arrangement of two members, "overlap as seen in a specific direction" means that when a virtual straight line parallel to the direction of line of sight is moved in directions orthogonal to the virtual straight line, there is at least a part of an area where the virtual straight line intersects both the two members. Further, in the present specification, regarding the arrangement of the two members, "arrangement areas in an axial direction overlap" means that, within the arrangement area of one member in the axial direction, at least a part of the arrangement area of the other member in the axial direction is included.

Figure 1:
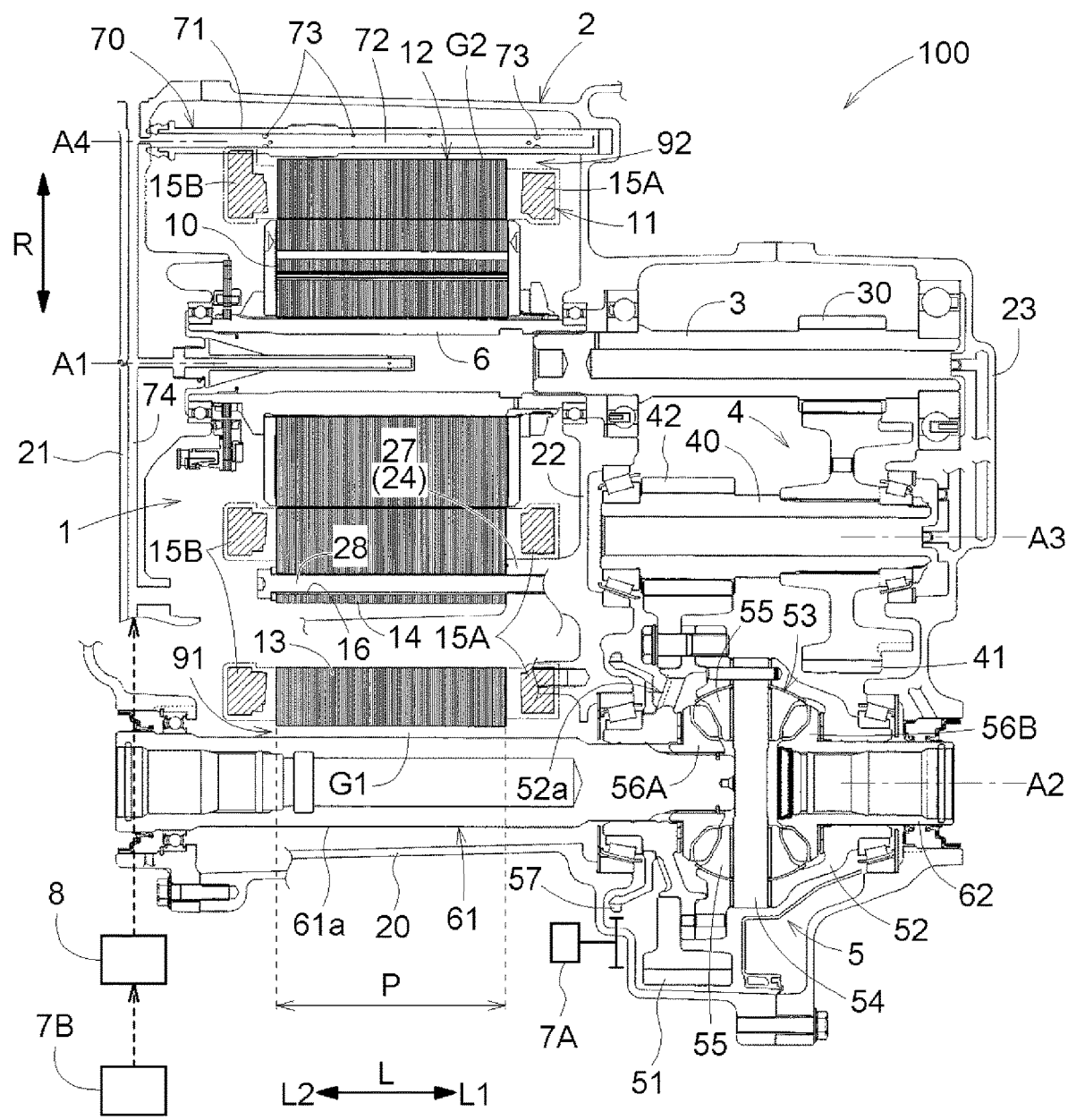
FIG. 1 is a sectional view of a vehicle drive device according to a first embodiment.

As shown in FIG. 1, a vehicle drive device 100 includes a rotary electric machine 1, an input member 3, a differential gear mechanism 5, and a case 2. The case 2 accommodates the rotary electric machine 1, the input member 3, and the differential gear mechanism 5. In the present embodiment, the vehicle drive device 100 further includes a counter gear mechanism 4. The case 2 also accommodates the counter gear mechanism 4. The case 2 also accommodates a first output member 61 and a second output member 62, which will be described later. Here, "accommodating" means accommodating at least a part of the object to be accommodated.

The vehicle drive device 100 transmits the output torque of the rotary electric machine 1 to a first wheel W1 and a second wheel W2 (see FIG. 2) to make the vehicle on which the vehicle drive device 100 is mounted travel. That is, the rotary electric machine 1 is a drive force source for the first wheel W1 and the second wheel W2. The first wheel W1 and the second wheel W2 are a pair of right and left wheels (for example, a pair of right and left front wheels or a pair of right and left rear wheels) in a vehicle. The rotary electric machine 1 is electrically connected to a power storage device (not shown) such as a battery or a capacitor, and receives a supply of power from the power storage device to perform power running, or supplies power generated by inertial force of the vehicle to the power storage device so as to store power.

Figure 2:
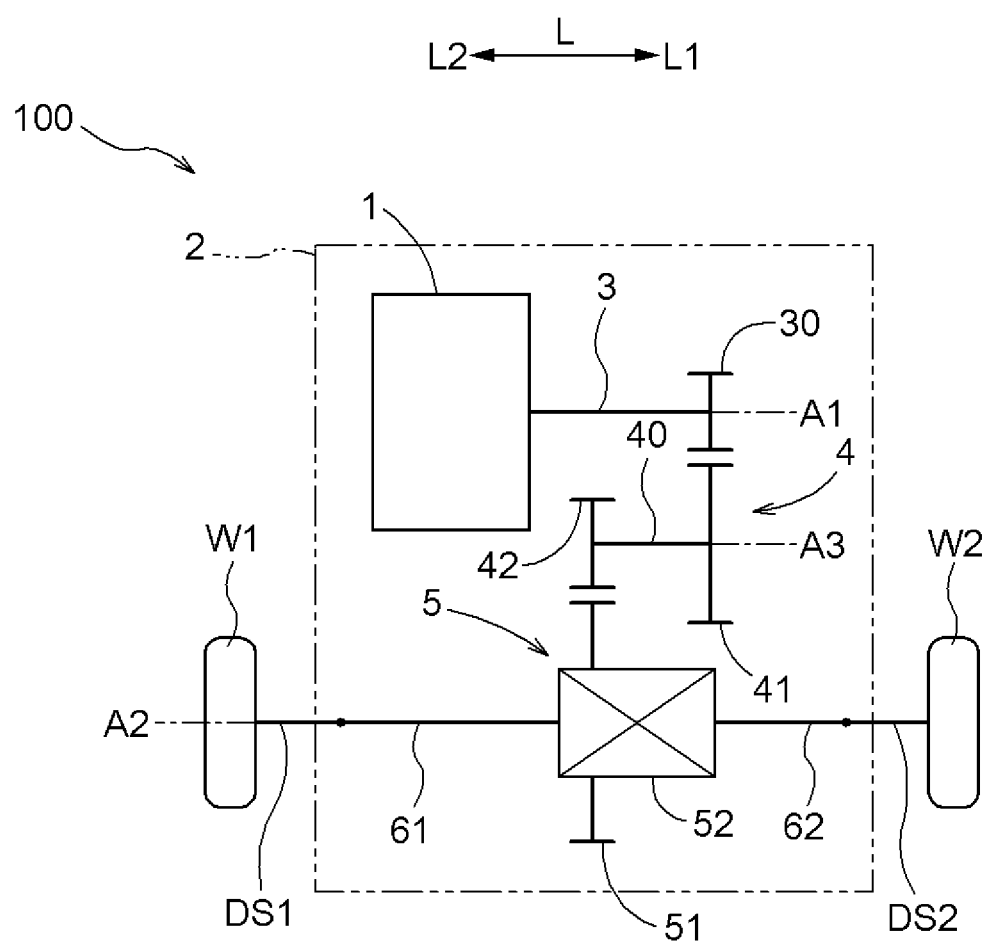
FIG. 2 is a skeleton diagram of a vehicle drive device according to the first embodiment.

As shown in FIGS. 1 and 2, the rotary electric machine 1 and the input member 3 are arranged on a first axis A1, and the differential gear mechanism 5 is arranged on a second axis A2 different from the first axis A1. Further, the counter gear mechanism 4 is arranged on a third axis A3 that is different from the first axis A1 and the second axis A2. The first axis A1, the second axis A2, and the third axis A3 are axes (virtual axes) arranged in parallel with each other.

As shown in FIG. 1, the rotary electric machine 1 includes a stator 11 fixed to the case 2 and a rotor 10 rotatably supported by the case 2 with respect to the stator 11. The rotary electric machine 1 includes the stator 11 on the outer side of the rotor 10 in a radial direction R. That is, the rotary electric machine 1 is an inner rotor type rotary electric machine. The stator 11 is arranged on the outer side of the rotor 10 in the radial direction R so as to overlap the rotor 10 as seen in a radial direction along the radial direction R. Here, as shown in FIGS. 1, 3, and 4, the radial direction R is the radial direction with reference to the first axis A1 in which the rotary electric machine 1 is arranged, in other words, the radial direction with reference to the rotation axis center of the rotary electric machine 1.

The stator 11 includes a stator core 12. As shown in FIGS. 1, 3, and 4, the stator core 12 includes a main body portion 13 formed in a cylindrical shape extending in an axial direction L. An outer peripheral surface of the main body portion 13 is formed along a cylindrical surface extending in the axial direction L. Here, the axial direction L is the direction in which the rotation axis center of the rotary electric machine 1 extends. That is, the axial direction L is a direction parallel to the first axis A1, in other words, an axial direction common between the first axis A1 and the second axis A2 (in the present embodiment, the axial direction common between the first axis A1, the second axis A2, and the third axis A3). The stator core 12 is formed by, for example, laminating a plurality of magnetic steel plates (for example, an electromagnetic steel plate such as a silicon steel plate) in the axial direction L, or is formed with a green compact, which is obtained by pressure-molding a powder of a magnetic material, serving as a main component.

Figure 3:
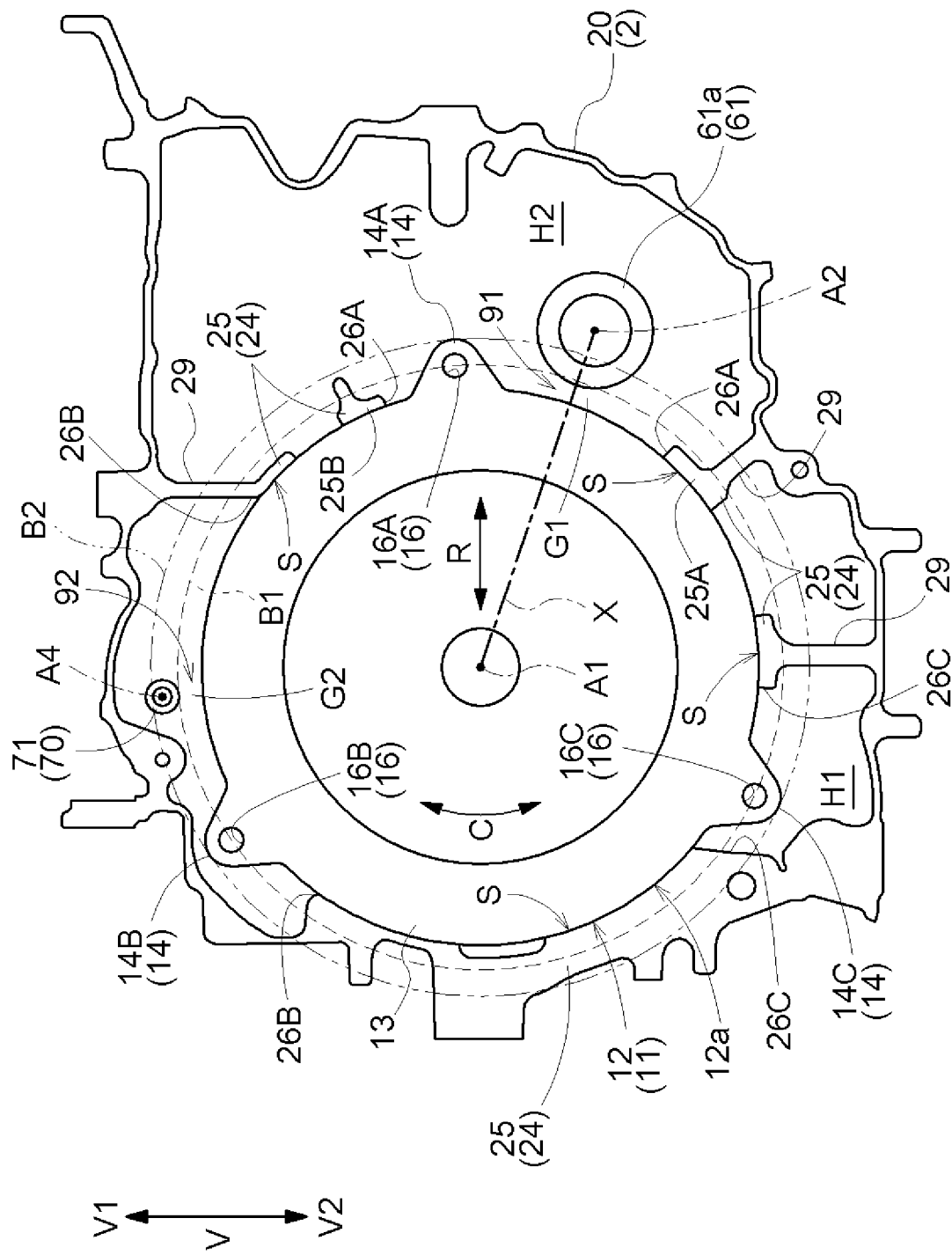
FIG. 3 is an axial view showing a support structure of a stator core according to the first embodiment.
Figure 4:
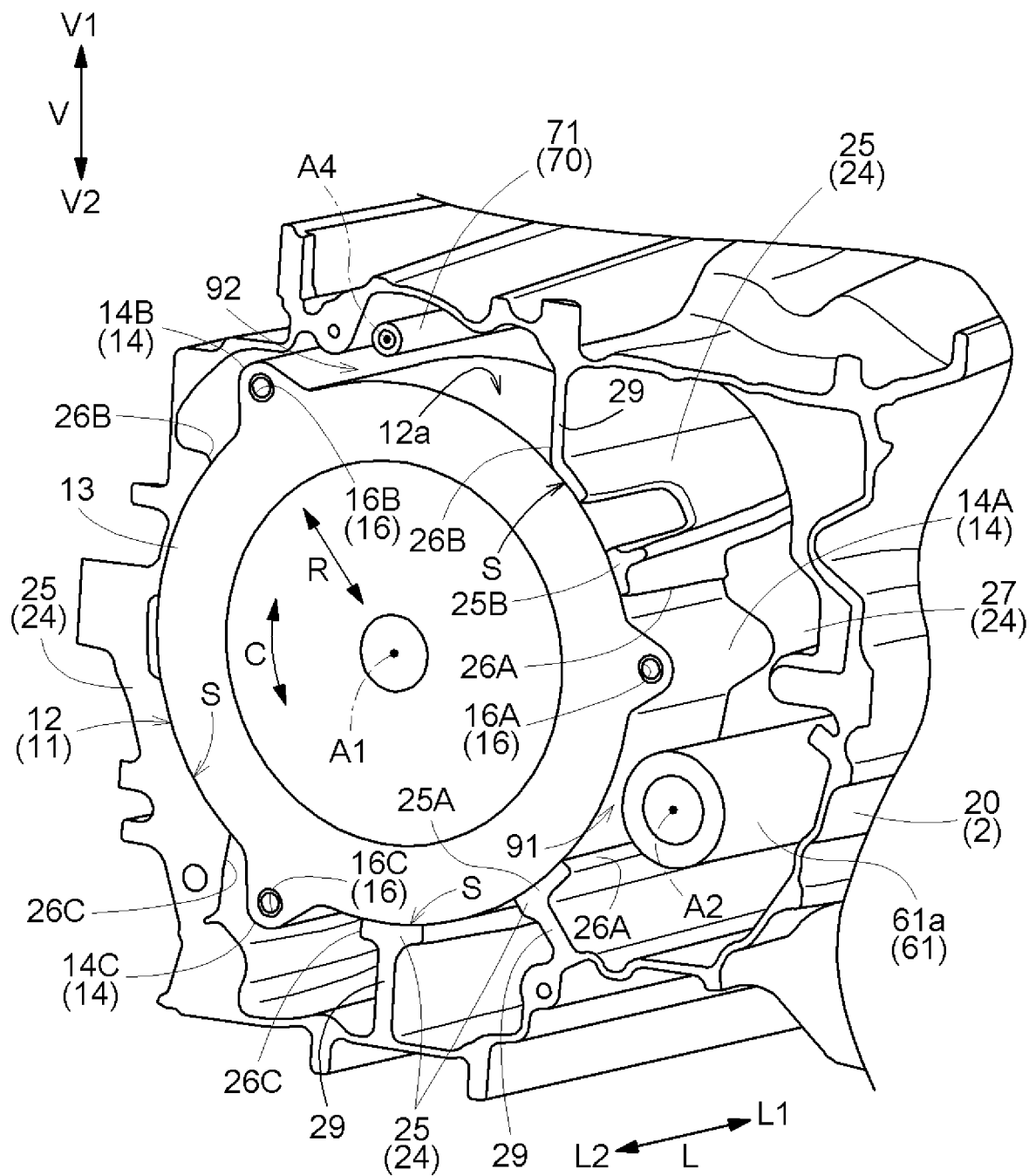
FIG. 4 is a perspective view showing the support structure of the stator core according to the first embodiment.

As shown in FIGS. 1, 3, and 4, in the present embodiment, the stator core 12 includes a protruding portion 14 formed so as to protrude outward in the radial direction R with respect to the main body portion 13. The stator core 12 is provided with the protruding portion 14 at a plurality of locations (three locations in this example) in a circumferential direction C. Here, the circumferential direction C is a circumferential direction with reference to the first axis A1 in which the rotary electric machine 1 is arranged, in other words, a circumferential direction with reference to the rotation axis center of the rotary electric machine 1. As described above, in the present embodiment, the stator core 12 includes the cylindrical main body portion 13 extending in the axial direction L, and the plurality of protruding portions 14 protruding outward in the radial direction R with respect to the main body portion 13. The protruding portions 14 are arranged so as to be dispersed in the circumferential direction C along the outer peripheral surface of the main body portion 13. The protruding portion 14 is formed so as to extend in the axial direction L. In the present example, the protruding portion 14 is formed over the entire region of the main body portion 13 in the axial direction L. The stator core 12 is fixed to the case 2 in the state in which an end surface of the protruding portion 14 in the axial direction L (in this example, an end surface on the axial first side L1 described later) is in contact with a fixing portion 27 (see FIGS. 1 and 4) formed in the case 2. That is, the protruding portions 14 are each fixed to the fixing portions 27. Specifically, an insertion hole 16 through which a fastening member 28 (see FIG. 1) such as a fastening bolt is inserted is formed in the protruding portion 14, and a fastening hole in which a fastening member 28 is fastened is formed in the fixing portion 27. The insertion hole 16 is formed so as to be extended through the protruding portion 14 in the axial direction L. Then, in a state in which the end surface of the protruding portion 14 in the axial direction L is in contact with the fixing portion 27 (specifically, a seat surface formed on the fixing portion 27), the protruding portion 14 is fastened and fixed to the fixing portion 27 by the fastening member 28. In this way, the insertion hole 16 through which the fastening member 28 for fixing the stator core 12 to the case 2 (specifically, the fixing portion 27) is formed so as to pass through each protruding portion 14 in the axial direction L.

The stator 11 includes a first coil end portion 15A protruding from the stator core 12 to an axial first side L1 that is one side of the axial direction L, and a second coil end portion 15B protruding from the stator core 12 to an axial second side L2 that is the other side in the axial direction L (opposite side of the axial first side L1 in the axial direction L). A coil is wound around the stator core 12, and a part of the coil protruding from the stator core 12 to the axial first side L1 forms the first coil end portion 15A, and a part of the coil protruding from the stator core 12 to the axial second side L2 forms the second coil end portion 15B.

As shown in FIG. 1, the input member 3 is drivingly connected to the rotor 10. Specifically, the input member 3 is connected to the rotor 10 so as to rotate integrally with the rotor 10. In the present embodiment, the vehicle drive device 100 includes a rotor shaft 6 to which the rotor 10 is fixed, and the input member 3 is connected to the rotor shaft 6 so as to rotate integrally with the rotor shaft 6. Specifically, a part of the input member 3 on the axial second side L2 is connected (here, spline-connected) to a part of the rotor shaft 6 on the axial first side L1. Unlike such a configuration, the configuration may be such that the vehicle drive device 100 does not include the rotor shaft 6, and the rotor 10 is fixed to the input member 3 (specifically, the part of the input member 3 on the axial second side L2).

The differential gear mechanism 5 distributes the drive force transmitted from the rotary electric machine 1 via the input member 3 to the first wheel W1 and the second wheel W2. The differential gear mechanism 5 includes a differential input gear 51, and the drive force from the rotary electric machine 1 input to the differential input gear 51 via the input member 3 is distributed to the first wheel W1 and the second wheel W2. As shown in FIG. 2, the vehicle drive device 100 includes a first output member 61 that is drivingly connected to the first wheel W1 and a second output member 62 that is drivingly connected to the second wheel W2. The differential gear mechanism 5 distributes the drive force transmitted from the rotary electric machine 1 via the input member 3 to the first output member 61 and the second output member 62 and thus, distributes the drive force to the first wheel W1 and the second wheel W2.

As shown in FIG. 2, in the present embodiment, the first output member 61 is connected to the first wheel W1 via a first output shaft DS1. Here, the first output shaft DS1 is a shaft member that rotates integrally with the first wheel W1, and is connected to the first wheel W1 via a constant velocity joint, for example. The first output member 61 is connected to the first output shaft DS1 so as to rotate integrally with the first output shaft DS1. Specifically, at least a part of the first output member 61 on the axial second side L2 is formed in a tubular shape (specifically, a cylindrical shape) extending in the axial direction L, and the first output shaft DS1 is inserted from the axial second side L2 into the first output member 61 (a space surrounded by an inner peripheral surface). Then, an engaging portion formed on the inner peripheral surface of the first output member 61 engages with an engaging portion formed on an outer peripheral surface of the first output shaft DS1 and thus, the first output member 61 is connected (here, spline-connected) to the first output shaft DS1. In the present embodiment, the first output member 61 corresponds to the "shaft member".

In the present embodiment, the second output member 62 is connected to the second wheel W2 via a second output shaft DS2. Here, the second output shaft DS2 is a shaft member that rotates integrally with the second wheel W2, and is connected to the second wheel W2 via a constant velocity joint, for example. The second output member 62 is connected to the second output shaft DS2 so as to rotate integrally with the second output shaft DS2. Specifically, at least a part of the second output member 62 on the axial first side L1 is formed in a tubular shape (specifically, a cylindrical shape) extending in the axial direction L, and the second output shaft DS2 is inserted from the axial first side L1 into the second output member 62 (a space surrounded by an inner peripheral surface). Then, an engaging portion formed on the inner peripheral surface of the second output member 62 engages with an engaging portion formed on an outer peripheral surface of the second output shaft DS2 and thus, the second output member 62 is connected (here, spline-connected) to the second output shaft DS2.

In the present embodiment, the first output member 61 and the second output member 62 are arranged on the second axis A2. Further, the first output member 61 is arranged on the axial second side L2 with respect to the second output member 62. As shown in FIG. 1, the first output member 61 includes a part arranged on the axial second side L2 with respect to the differential gear mechanism 5. That is, the differential gear mechanism 5 is connected to the first wheel W1 via the first output member 61 including a part that is arranged on the second axis A2 on the axial second side L2 with respect to the differential gear mechanism 5. Further, the second output member 62 includes a part arranged on the axial first side L1 with respect to the differential gear mechanism 5. That is, the differential gear mechanism 5 is connected to the second wheel W2 via the second output member 62 including a part that is arranged on the second axis A2 on the axial first side L1 with respect to the differential gear mechanism 5.

As shown in FIG. 1, in the present embodiment, the differential gear mechanism 5 is a bevel gear type differential gear mechanism. The differential gear mechanism 5 includes a gear group 53 and a differential case portion 52 surrounding the gear group 53. The differential case portion 52 is supported by the case 2 so as to be rotatable with respect to the case 2. The differential input gear 51 is connected to the differential case portion 52 so as to rotate integrally with the differential case portion 52. Specifically, the differential input gear 51 is mounted on the differential case portion 52 so as to protrude outward from the differential case portion 52 in a radial direction (radial direction with reference to the second axis A2). In the present embodiment, the differential input gear 51 is arranged on the axial second side L2 with respect to a pinion shaft 54 described later.

The gear group 53 includes a pinion gear 55 and includes a first side gear 56A and a second side gear 56B that each mesh with the pinion gear 55. The pinion gears 55 (for example, two pinion gears 55) are supported by a pinion shaft 54 so as to be rotatable with respect to the pinion shaft 54 held in the differential case portion 52. The first side gear 56A is arranged on the axial second side L2 with respect to the pinion shaft 54, and the second side gear 56B is arranged on the axial first side L1 with respect to the pinion shaft 54. The differential gear mechanism 5 distributes rotation of the differential input gear 51 to the first side gear 56A and the second side gear 56B. The differential gear mechanism 5 may be configured to be a planetary gear type differential gear mechanism. In this case, the gear group 53 includes, for example, a pinion gear that is supported by a carrier, and a sun gear and a ring gear that each mesh with the pinion gear.

The first side gear 56A rotates integrally with the first output member 61, and the second side gear 56B rotates integrally with the second output member 62. In the present embodiment, the first side gear 56A is formed in a member different from the member that configures the first output member 61, and the first side gear 56A is connected (here, spline-connected) to the first output member 61 so as to rotate integrally with the first output member 61. The first side gear 56A is connected to an end portion of the first output member 61 on the axial first side L1. Further, in the present embodiment, the second side gear 56B is formed on a member that configures the second output member 62. Specifically, the second side gear 56B is formed at an end portion of the second output member 62 on the axial second side L2.

The counter gear mechanism 4 drivingly connects the input member 3 and the differential gear mechanism 5. The counter gear mechanism 4 includes a first gear 41, a second gear 42, and a counter shaft 40 connecting the first gear 41 and the second gear 42. In the present embodiment, the second gear 42 is arranged on the axial second side L2 with respect to the first gear 41. The first gear 41 meshes with an input gear 30 that rotates integrally with the input member 3, and the second gear 42 meshes with the differential input gear 51. Thus, rotation of the input member 3 is input to the differential gear mechanism 5 via the counter gear mechanism 4. In the present embodiment, the first gear 41 is formed to have a larger diameter than the input gear 30, and the second gear 42 is formed to have a smaller diameter than the differential input gear 51. Thus, rotation of the input member 3 is decelerated in accordance with a gear ratio between the input gear 30 and the first gear 41, and is further decelerated in accordance with a gear ratio between the second gear 42 and the differential input gear 51 (that is, decelerated by two steps), and is input to the differential gear mechanism 5.

As shown in FIGS. 1, 3, and 4, the case 2 includes a peripheral wall portion 20 that surrounds the stator 11 from the outer side in the radial direction R. As shown in FIG. 1, the case 2 further includes a first wall portion 21, a second wall portion 22, and a third wall portion 23. The peripheral wall portion 20 is formed in a tubular shape extending in the axial direction L (here, a tubular shape in which the cross-sectional shape differs depending on the position in the axial direction L). The second wall portion 22 is arranged on the axial first side L1 with respect to the first wall portion 21, and the third wall portion 23 is arranged on the axial first side L1 with respect to the second wall portion 22. An internal space of the case 2 formed by being surrounded by the peripheral wall portion 20, the first wall portion 21, and the third wall portion 23 is divided in the axial direction L by the second wall portion 22.

As shown in FIG. 1, the input member 3 includes a part arranged on the axial first side L1 with respect to the rotary electric machine 1. In the present embodiment, the rotary electric machine 1 is arranged between the first wall portion 21 and the second wall portion 22 in the axial direction L. The rotor shaft 6 is supported by the first wall portion 21 via a bearing and is supported by the second wall portion 22 via another bearing. On the other hand, the input member 3 is supported by the second wall portion 22 via a bearing and is supported by the third wall portion 23 via another bearing. A part of the input member 3 arranged between the second wall portion 22 and the third wall portion 23 in the axial direction L is arranged on the axial first side L1 with respect to the rotary electric machine 1. The input gear 30 that rotates integrally with the input member 3 is arranged between the second wall portion 22 and the third wall portion 23 in the axial direction L. That is, the input gear 30 is provided in a part of the input member 3 arranged on the axial first side L1 with respect to the rotary electric machine 1.

The differential gear mechanism 5 includes a part arranged on the axial first side L1 with respect to the rotary electric machine 1. In the present embodiment, the differential case portion 52 is supported by the second wall portion 22 via a bearing and is supported by the third wall portion 23 via another bearing. The gear group 53 and the differential input gear 51 are arranged on the axial first side L1 with respect to the rotary electric machine 1. That is, in the present embodiment, the gear group 53 that configures the differential gear mechanism 5 is arranged on the axial first side L1 with respect to the stator 11. Further, in the present embodiment, the stator 11 is arranged so as to overlap the gear group 53 as seen in the axial direction along the axial direction L. The first output member 61 is arranged so as to pass through a through hole formed in the second wall portion 22 and extend along the axial direction L, and is supported by the first wall portion 21 via a bearing.

In this way, the input member 3 and the differential gear mechanism 5 include a part arranged on the axial first side L1 with respect to the rotary electric machine 1. The part of the input member 3 arranged on the axial first side L1 with respect to the rotary electric machine 1 and the part of the differential gear mechanism 5 arranged on the axial first side L1 with respect to the rotary electric machine 1 are drivingly connected. In the present embodiment, the part of the input member 3 arranged on the axial first side L1 with respect to the rotary electric machine 1 and the part of the differential gear mechanism 5 arranged on the axial first side L1 with respect to the rotary electric machine 1 are drivingly connected via the counter gear mechanism 4. The counter gear mechanism 4 includes a part arranged on the axial first side L1 with respect to the rotary electric machine 1. In the present embodiment, the counter shaft 40 is supported by the second wall portion 22 via a bearing and is supported by the third wall portion 23 via another bearing. The first gear 41 and the second gear 42 are arranged between the second wall portion 22 and the third wall portion 23 in the axial direction L.

As shown in FIG. 1, in the present embodiment, the vehicle drive device 100 includes a first hydraulic pump 7A and a second hydraulic pump 7B. Each of the first hydraulic pump 7A and the second hydraulic pump 7B sucks oil stored in an oil storage portion provided in a lower portion of the case 2 and the like to generate hydraulic pressure. In the present embodiment, the oil discharged from the first hydraulic pump 7A is supplied for lubrication to a rotation member and a bearing provided in the vehicle drive device 100. Further, in the present embodiment, the oil discharged from the second hydraulic pump 7B passes through an oil cooler 8 that is a heat exchanger for cooling the oil, and then supplies the oil to a cooling target part of the rotary electric machine 1 for cooling. The cooling target part of the rotary electric machine 1 includes an outer peripheral surface of the stator core 12, the first coil end portion 15A, and the second coil end portion 15B. As the first hydraulic pump 7A and the second hydraulic pump 7B, an internal gear pump, an external gear pump, a vane pump, or the like can be used, for example.

The first hydraulic pump 7A is an oil pump (so-called mechanical oil pump) driven by power transmitted through a power transmission path connecting the rotary electric machine 1 and the wheels (first wheel W1 and second wheel W2). In the present embodiment, a gear that rotates integrally with a drive shaft of the first hydraulic pump 7A meshes with the pump drive gear 57 that rotates integrally with the differential case portion 52. Thus, the first hydraulic pump 7A is driven by rotation of the differential case portion 52. On the other hand, the second hydraulic pump 7B is an oil pump (so-called electric oil pump) driven by an electric motor independent of the power transmission path.

As shown in FIG. 1, in the present embodiment, the vehicle drive device 100 includes an oil supply portion 70 that supplies oil for cooling to the stator 11. In the present embodiment, the oil supply portion 70 includes a supply pipe 71 that extends along the axial direction L and that is arranged so as to face the stator 11 in the radial direction R. The supply pipe 71 is arranged on the outer side of the stator 11 in the radial direction R. In the present embodiment, in a state in which the vehicle drive device 100 is mounted on the vehicle, the supply pipe 71 is arranged so as to overlap the stator 11 as seen in a vertical direction along a vertical direction V, on an upper side V1 of the stator 11 in the vertical direction V. Here, the "vertical direction V" means the vertical direction in a used state of the vehicle drive device 100, that is, the vertical direction when the vehicle drive device 100 is arranged in the direction in the used state. Since the vehicle drive device 100 is mounted on the vehicle and used, the vertical direction V coincides with the vertical direction in a state in which the vehicle drive device 100 is mounted on the vehicle, and more specifically, the vertical direction in a state in which the vehicle drive device 100 is mounted on the vehicle and in a state in which the vehicle is stopped on a flat road (road along a horizontal plane). The upper side V1 and a lower side V2 mean the upper side and the lower side in the vertical direction V. In the present embodiment, the vehicle drive device 100 is mounted on the vehicle so that the axial direction L is along the right-left direction of the vehicle. Thus, a horizontal direction as seen in the axial direction (see FIG. 3) along the axial direction L is the direction along the front-rear direction of the vehicle.

Inside the supply pipe 71, a flow passage 72 for circulating oil is formed. The supply pipe 71 has a cylindrical inner peripheral surface extending along the axial direction L, and the flow passage 72 is defined by the cylindrical inner peripheral surface. In the present embodiment, a supply oil passage 74 is provided in the first wall portion 21. In the present embodiment, the oil discharged from the second hydraulic pump 7B is supplied to the supply oil passage 74 after passing through the oil cooler 8. The supply pipe 71 is supported by the case 2 so that the flow passage 72 communicates with the supply oil passage 74. Thus, the oil discharged from the second hydraulic pump 7B is supplied to the flow passage 72 via the supply oil passage 74. Here, an end portion of the supply pipe 71 on the axial second side L2 is supported by the first wall portion 21, and an end portion of the supply pipe 71 on the axial first side L1 is supported by the second wall portion 22.

The supply pipe 71 includes a supply hole 73 for supplying oil toward the stator 11. As a result, the oil flowing through the flow passage 72 is supplied to the stator 11 from the supply hole 73, and the stator 11 is cooled. The supply hole 73 is formed so as to pass through a peripheral wall portion of the supply pipe 71 and communicate the inner peripheral surface and an outer peripheral surface of the supply pipe 71. In the present embodiment, the supply pipe 71 includes a plurality of the supply holes 73. The supply holes 73 include the supply hole 73 for supplying the oil toward the stator core 12, the supply hole 73 for supplying the oil toward the first coil end portion 15A, and the supply hole 73 for supplying the oil toward the second coil end portion 15B.

The supply hole 73 for supplying the oil toward the stator core 12 is arranged on the outer side of the stator core 12 in the radial direction R so as to overlap the stator core 12 as seen in the radial direction along the radial direction R. Here, the supply hole 73 for supplying the oil toward the stator core 12 is arranged on the upper side V1 of the stator core 12 in the vertical direction V so as to overlap the stator core 12 as seen in the vertical direction along the vertical direction V. The supply hole 73 for supplying the oil toward the first coil end portion 15A is arranged on the outer side of the first coil end portion 15A in the radial direction R so as to overlap the first coil end portion 15A as seen in the radial direction along the radial direction R. Here, the supply hole 73 for supplying the oil toward the first coil end portion 15A is arranged on the upper side V1 of the first coil end portion 15A in the vertical direction V so as to overlap the first coil end portion 15A as seen in the vertical direction along the vertical direction V. The supply hole 73 for supplying the oil toward the second coil end portion 15B is arranged on the outer side of the second coil end portion 15B in the radial direction R so as to overlap the second coil end portion 15B as seen in the radial direction along the radial direction R. Here, the supply hole 73 for supplying the oil toward the second coil end portion 15B is arranged on the upper side V1 of the second coil end portion 15B in the vertical direction V so as to overlap the second coil end portion 15B as seen in the vertical direction along the vertical direction V.

As shown in FIG. 1, in the present embodiment, the differential case portion 52 includes an opening portion 52a that communicates the inside and the outer side of the differential case portion 52. In the present embodiment, the opening portion 52a is provided on the axial second side L2 with respect to the pinion shaft 54. In the present embodiment, an oil storage portion for storing oil is formed in the portion inside the case 2 (bottom part of the case 2) on the lower side V2 in the vertical direction V, and the oil is scraped up from the oil storage portion by the differential input gear 51. The oil scraped up by the differential input gear 51 is configured to be supplied from the outer side of the differential case portion 52 to the opening portion 52a under the action of gravity.

In this vehicle drive device 100, it is easy to keep an axial distance between the first axis A1 in which the rotary electric machine 1 is arranged and the second axis A2 in which the differential gear mechanism 5 is arranged short, and hereafter this matter will be described.

The rotary electric machine 1 is arranged in a first space H1 inside the case 2, and the first output member 61 is arranged in a second space H2 inside the case 2 (see FIG. 3). The second space H2 communicates with the first space H1 inside the case 2. In the present embodiment, as shown in FIG. 1, in an entire arrangement area P in the axial direction L of the stator core 12 provided in the stator 11, the stator core 12 (here, the main body portion 13) and the first output member 61 are arranged so as to directly face each other in the radial direction R (in other words, directly face each other in the radial direction R with a first gap G1 therebetween). The arrangement area P is an area in the axial direction L between the end surface of the stator core 12 on the axial first side L1 and an end surface of the stator core 12 on the axial second side L2. The first output member 61 is formed to have a smaller diameter than the stator core 12. As shown in FIGS. 3 and 4, the first output member 61 is arranged so as to overlap the stator core 12 as seen in the radial direction along the radial direction R, in an area of a part in the circumferential direction C. In the present embodiment, the stator core 12 is arranged so as to overlap the gear group 53 that configures the differential gear mechanism 5 as seen in the axial direction along the axial direction L. The first gap G1 that is a gap formed between the stator core 12 and the first output member 61 is about 3 to 5 [mm], for example. In the present embodiment, the first space H1 corresponds to "the accommodation space of the rotary electric machine", and the second space H2 corresponds to "the space communicating with the accommodation space of the rotary electric machine".

In the present embodiment, the stator 11 and the first output member 61 are arranged so as to directly face each other in the radial direction R, in the entire arrangement area of the stator 11 in the axial direction L. Here, the arrangement area of the stator 11 in the axial direction L is an area between an end portion of the first coil end portion 15A on the axial first side L1 and an end portion of the second coil end portion 15B on the axial second side L2, in the axial direction L. The first output member 61 is supported by the first wall portion 21 via a bearing, and the bearing is arranged on the axial second side L2 with respect to the stator core 12. In the present embodiment, this bearing is arranged on the axial second side L2 with respect to the second coil end portion 15B.

Further, in the entire arrangement area P in the axial direction L of the stator core 12, the stator core 12 (here, the main body portion 13) and the supply pipe 71 provided in the oil supply portion 70 are arranged so as to directly face each other in the radial direction R (in other words, directly face each other in the radial direction R with a second gap G2 therebetween). The supply pipe 71 is formed to have a smaller diameter than the stator core 12. As shown in FIGS. 3 and 4, the supply pipe 71 is arranged so as to overlap the stator core 12 as seen in the radial direction along the radial direction R in an area of a part in the circumferential direction C. In the present embodiment, the stator 11 and the supply pipe 71 are arranged so as to directly face each other in the radial direction R, in the entire arrangement area of the stator 11 in the axial direction L.

As shown in FIG. 1, in the present embodiment, the first output member 61 includes a same diameter portion 61a having an outer diameter uniformly formed along the axial direction L. The same diameter portion 61a faces the stator core 12 in the radial direction R in the entire arrangement area P of the stator core 12 in the axial direction L. In the present embodiment, the same diameter portion 61a faces the stator 11 in the radial direction R in the entire arrangement area of the stator 11 in the axial direction L.

As shown in FIGS. 3 and 4, the case 2 includes a stator support portion 24 that supports the stator core 12. The stator support portion 24 is provided so as to avoid a first facing area 91 that is an area in which the stator core 12 (here, the main body portion 13) and the first output member 61 face each other in the radial direction R. That is, the stator support portion 24 is provided in an area adjacent to the first facing area 91 (for example, an area adjacent in the circumferential direction C), and is not provided in the first facing area 91. The stator support portion 24 is provided so as to avoid a second facing area 92 that is an area in which the stator core 12 (here, the main body portion 13) and the supply pipe 71 face each other in the radial direction R. That is, the stator support portion 24 is provided in an area adjacent to the second facing area 92 (for example, an area adjacent in the circumferential direction C), and is not provided in the second facing area 92. In the present embodiment, the first output member 61 and the supply pipe 71 are arranged at different positions in the circumferential direction C. The first output member 61 and the supply pipe 71 face the stator core 12 (here, the main body portion 13) in the radial direction R at different positions in the circumferential direction C. Thus, the first facing area 91 and the second facing area 92 are formed at different positions in the circumferential direction C.

In the present embodiment, the stator support portion 24 includes the fixing portion 27 described above. Further, in the present embodiment, the stator support portion 24 includes an outer peripheral support portion 25 that supports a core outer peripheral surface 12*a*, which is the outer peripheral surface of the stator core 12, in the radial direction R. That is, the case 2 includes the outer peripheral support portion 25 that supports the core outer peripheral surface 12*a* in the radial direction R. Here, the concept of the outer peripheral support portion 25 supporting the core outer peripheral surface 12*a* is not limited to a case in which the outer peripheral support portion 25 is constantly in contact with the core outer peripheral surface 12*a* to support the outer peripheral surface, and is a concept including a case in which when the outer peripheral support portion 25 is arranged with a gap with respect to the core outer peripheral surface 12*a* and the stator core 12 moves in a direction intersecting the axial direction L (including when the stator core 12 is inclined with respect to the axial direction L), the outer peripheral support portion 25 is in contact with the core outer peripheral surface 12*a* and supports the outer peripheral surface. In the latter case, the movement of the stator core 12 in the direction intersecting the axial direction L is limited to a range corresponding to a gap formed between the outer peripheral support portion 25 and the core outer peripheral surface 12*a*. It is preferable that this gap is set to a size (for example, a gap narrower than the first gap G1) in which the stator core 12 and the first output member 61 do not come into contact with each other even if the stator core 12 moves in the direction intersecting the axial direction L. Further, it is preferable that this gap is set to a size in which the stator core 12 and the rotor 10 do not come into contact with each other even if the stator core 12 moves in the direction intersecting the axial direction L.

The outer peripheral support portion 25 is formed along the core outer peripheral surface 12*a*. Specifically, at least an inner side part of the outer peripheral support portion 25 in the radial direction R is formed along the core outer peripheral surface 12*a*. The outer peripheral support portion 25 includes an inner peripheral surface (support inner peripheral surface) that surrounds the core outer peripheral surface 12*a* from the outer side in the radial direction R. That is, the outer peripheral support portion 25 includes a support surface S facing the core outer peripheral surface 12*a*. The support surface S is arranged so as to face the core outer peripheral surface 12*a* so as to be in contact with the core outer peripheral surface 12*a*, or is arranged so as to face the core outer peripheral surface 12*a* with a gap with respect to the core outer peripheral surface 12*a*. The support surface S is a surface that supports the core outer peripheral surface 12*a*. Specifically, the support surface S is constantly in contact with the core outer peripheral surface 12*a* to support the outer peripheral surface, or is arranged with a gap with respect to the core outer peripheral surface 12*a* and is in contact with the core outer peripheral surface 12*a* and supports the outer peripheral surface when the stator core 12 moves in the direction intersecting the axial direction L. Further, the outer peripheral support portion 25 includes a part arranged on the lower side V2 of the rotary electric machine 1.

In the present embodiment, the outer peripheral support portion 25 has a radial protruding portion 29 that protrudes inward in the radial direction R from an inner peripheral surface of the peripheral wall portion 20 and that also has the support surface S formed on an end portion on an inner side in the radial direction R. An arrangement area of the first output member 61 in the radial direction R overlaps an arrangement area of the outer peripheral support portion 25 in the radial direction R. That is, the first output member 61 is arranged at the position in the circumferential direction C at which the outer peripheral support portion 25 is not arranged so that the arrangement area of the first output member 61 in the radial direction R overlaps with the arrangement area of the outer peripheral support portion 25 in the radial direction R. Specifically, the arrangement area of the first output member 61 in radial direction R overlaps with an arrangement area of the radial protruding portion 29 in the radial direction R. That is, the first output member 61 is arranged at the position in the circumferential direction C at which the radial protruding portion 29 is not arranged so that the arrangement area of the first output member 61 in the radial direction R overlaps with the arrangement area of the radial protruding portion 29 in the radial direction R.

The stator core 12 is arranged so that, for example, the core outer peripheral surface 12*a* is fitted to a support inner peripheral surface (fitting inner peripheral surface) of the outer peripheral support portion 25 by gap fitting. As will be described later, the outer peripheral support portion 25 includes a first notch portion 26A and a second notch portion 26B (in the present embodiment, further, a third notch portion 26C), and the outer peripheral support portion 25 is provided with a plurality of support parts separated in the circumferential direction C by the notch portions. The support parts include a first support part 25A and a second support part 25B, which will be described later. An inner peripheral surface (an inner side surface in the radial direction R, that is, the support surface S) of each of the support parts is arranged along the support inner peripheral surface of the outer peripheral support portion 25. That is, the support inner peripheral surface of the outer peripheral support portion 25 is formed by an assembly of the inner peripheral surface (inner side surface in the radial direction R) of each of the support parts. In other words, the core outer peripheral surface 12*a* is fitted to the support surface S, and specifically, is fitted to a cylindrical surface (cylindrical surface having a discontinuous portion) formed by a plurality of the support surfaces S. This fitting is, for example, a gap fitting.

As shown in FIGS. 3 and 4, the outer peripheral support portion 25 is provided with the first notch portion 26A formed in an area in the circumferential direction C overlapping the first facing area 91 (hereinafter, referred to as a "first circumferential area"). The first notch portion 26A is formed over the entire area of the stator core 12 in the axial direction L. That is, the first notch portion 26A is formed by notching a part of the outer peripheral support portion 25 arranged in the first circumferential area over the entire area in the axial direction L. The first circumferential area is set to include the entire first facing area 91. Thus, the outer peripheral support portion 25 is provided so as not to overlap with the first output member 61 as seen in the radial direction along the radial direction R. The area in the circumferential direction C in which the first notch portion 26A is formed is an area of about 80 degrees in terms of an angle around the first axis A1, for example.

As described above, in the outer peripheral support portion 25, the first notch portion 26A in which the outer peripheral support portion 25 is notched over the entire area of the arrangement area P in the axial direction L of the stator core 12 is formed. The first notch portion 26A is formed by notching at least an outer side part of the outer peripheral support portion 25 in the radial direction R. In the present embodiment, the first notch portion 26A is formed by notching the entire area of the outer peripheral support portion 25 in the radial direction R. Thus, in the present embodiment, in the area where the first notch portion 26A is formed, the core outer peripheral surface 12*a* is exposed without being covered by the outer peripheral support portion 25. The first notch portion 26A is arranged at a position that is between the core outer peripheral surface 12a (here, the outer peripheral surface of the main body portion 13) and the first output member 61 in the radial direction R and that overlaps the first output member 61 as seen in the radial direction. That is, the first output member 61 is arranged at a position that is on an outer side in the radial direction R with respect to the first notch portion 26A and that overlaps the first notch portion 26A as seen in the radial direction. In the present embodiment, the first notch portion 26A corresponds to the "notch portion".

As described above, the first notch portion 26A is arranged at a position that is between the core outer peripheral surface 12a and the first output member 61 in the radial direction R and that overlaps the first output member 61 as seen in the radial direction. In other words, the first notch portion 26A is arranged on a line connecting the first axis A1 (the axial center of the rotary electric machine 1) and the second axis A2 (the axial center of the first output member 61). In other words, the first notch portion 26A is arranged at a position overlapping with the first output member 61 in the radial direction R (the radial direction of the rotary electric machine 1). That is, the first notch portion 26A is arranged at a position facing the first output member 61 in the radial direction R (in other words, at the same position in the circumferential direction C as the first output member 61). Here, the above-described line connecting the first axis A1 and the second axis A2 is a virtual line segment indicated by "X" in FIG. 3, and specifically, is a virtual line segment connecting the first axis A1 and the second axis A2 as seen in the axial direction, in other words, is a part interposed between the first axis A1 and the second axis A2 at an intersection line of two virtual planes that are a virtual plane orthogonal to the axial direction L and a virtual plane including the first axis A1 and the second axis A2.

The outer peripheral support portion 25 includes the second notch portion 26B formed in an area (hereinafter, referred to as a "second circumferential area") in the circumferential direction C overlapping the second facing area 92. The second notch portion 26B is formed over the entire area of the stator core 12 in the axial direction L. That is, the second notch portion 26B is formed by notching a part of the outer peripheral support portion 25 arranged in the second circumferential area over the entire area in the axial direction L. The second circumferential area is set to include the entire second facing area 92. Thus, the outer peripheral support portion 25 is provided so as not to overlap with the supply pipe 71 as seen in the radial direction along the radial direction R.

As described above, in the present embodiment, in the outer peripheral support portion 25, the second notch portion 26B in which the outer peripheral support portion 25 is notched over the entire area of the arrangement area P in the axial direction L of the stator core 12 is formed. The second notch portion 26B is formed at a position different in the circumferential direction C from that of the first notch portion 26A in the outer peripheral support portion 25. The second notch portion 26B is formed by notching at least the outer side part of the outer peripheral support portion 25 in the radial direction R. In the present embodiment, the second notch portion 26B is formed by notching the entire area of the outer peripheral support portion 25 in the radial direction R. The second notch portion 26B is arranged at a position that is between the core outer peripheral surface 12a (here, the outer peripheral surface of the main body portion 13) and the supply pipe 71 in the radial direction R and that overlaps the supply pipe 71 as seen in the radial direction. That is, the supply pipe 71 is arranged at a position that is on an outer side in the radial direction R with respect to the second notch portion 26B and that overlaps the second notch portion 26B as seen in the radial direction.

The notch portion in which the outer peripheral support portion 25 is notched is also formed in the area in the circumferential direction C that overlaps with the protruding portion 14. That is, the outer peripheral support portion 25 is provided so as to support the outer peripheral surface of the main body portion 13 included in the stator core 12. As shown in FIGS. 3 and 4, in the present embodiment, the stator core 12 includes three protruding portions 14 that are a first protruding portion 14A, a second protruding portion 14B, and a third protruding portion 14C. Here, among the protruding portions 14 (here, the three protruding portions 14), the protruding portion 14 arranged closest to the first output member 61 is referred to as the first protruding portion 14A, the protruding portion 14 arranged closest to the supply pipe 71 is referred to as the second protruding portion 14B, and the remaining one protruding portion 14 is referred to as the third protruding portion 14C. The first notch portion 26A is formed in an area in the circumferential direction C that overlaps the first facing area 91 and the first protruding portion 14A. That is, the notch corresponding to the first protruding portion 14A is integrally formed with the first notch portion 26A. Further, the second notch portion 26B is formed in an area in the circumferential direction C that overlaps the second facing area 92 and the second protruding portion 14B. That is, the notch corresponding to the second protruding portion 14B is integrally formed with the second notch portion 26B. Further, the outer peripheral support portion 25 includes the third notch portion 26C formed in an area in the circumferential direction C overlapping the third protruding portion 14C (hereinafter, referred to as the "third circumferential area"). The third notch portion 26C is formed over the entire area of the stator core 12 in the axial direction L. That is, the third notch portion 26C is formed by notching a part of the outer peripheral support portion 25 arranged in the third circumferential area over the entire area in the axial direction L.

As shown in FIG. 3, the outer peripheral support portion 25 includes two support parts arranged on both sides in the circumferential direction C with the first notch portion 26A interposed therebetween. Here, one of the two support parts (here, the one arranged on the lower side V2) is referred to as the first support part 25A, and the other is referred to as the second support part 25B. The first protruding portion 14A is arranged between the first support part 25A and the second support part 25B in the circumferential direction C. In the present embodiment, the first output member 61 is arranged between one protruding portion 14 (here, the first protruding portion 14A) of the protruding portions 14 and the first support part 25A in the circumferential direction C so that the first output member 61 extends in the axial direction L. The support surface S is formed on both sides of the first notch portion 26A along the circumferential direction C of the core outer peripheral surface 12a. Specifically, the support surface S formed by an inner peripheral surface of the first support part 25A is arranged on one side in the circumferential direction C with respect to the first notch portion 26A, and the support surface S formed by an inner peripheral surface of the second support part 25B is arranged on the other side in the circumferential direction C with respect to the first notch portion 26A. Further, in the present embodiment, the first output member 61 is arranged on the lower side V2 of the first axis A1 and is arranged on the upper side V1 of a lowermost portion of the rotary electric machine 1. In the present embodiment, the first protruding portion 14A corresponds to "the target protruding portion", and the first support part 25A corresponds to "the target support part".

Further, in the present embodiment, as seen in the axial direction along the axial direction L, a part of the first output member 61 is arranged so as to overlap a first virtual circle B1 passing through a center of a plurality of the insertion holes 16 formed in the protruding portions 14. The first virtual circle B1 is a virtual circle in which the center is the first axis A1 as seen in the axial direction. In the present embodiment, as seen in the axial direction, the first virtual circle B1 is a virtual circle that passes through a center of a first insertion hole 16A that is the insertion hole 16 formed in the first protruding portion 14A, a center of a second insertion hole 16B that is the insertion hole 16 formed in the second protruding portion 14B, and a center of a third insertion hole 16C that is the insertion hole 16 formed in the third protruding portion 14C. As described above, in the present embodiment, as seen in the axial direction, at least a part of the first output member 61 (here, only the inner side portion in the radial direction R) is arranged on the inner side of the first virtual circle B1 in the radial direction R. In the present embodiment, the first virtual circle B1 corresponds to "the virtual circle passing through the centers of the insertion holes formed in the protruding portions".

Second Embodiment

Figure 5:
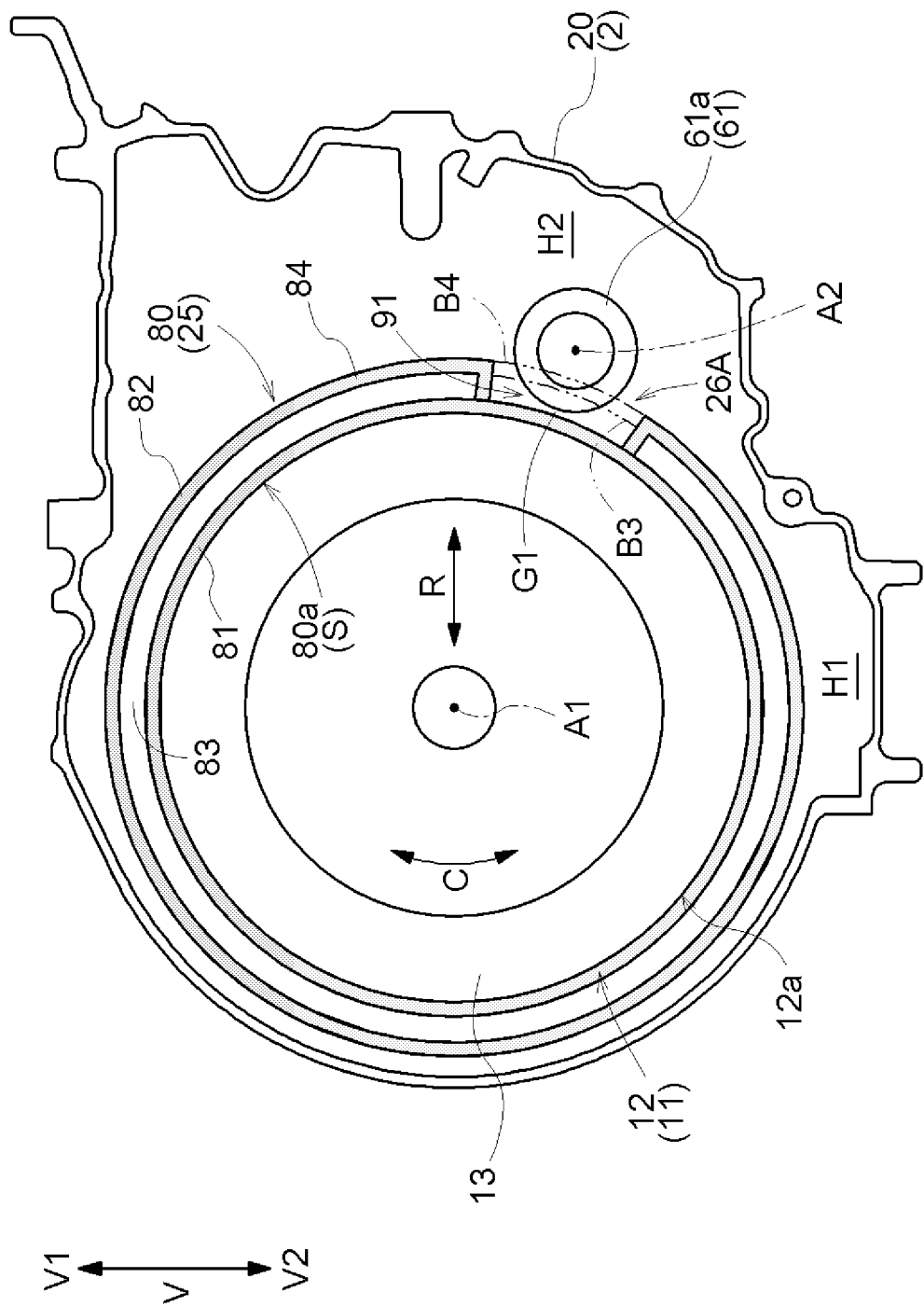
FIG. 5 is an axial view showing the support structure of the stator core according to a second embodiment.

A second embodiment of the vehicle drive device will be described with reference to the drawings (FIG. 5). Hereinafter, the vehicle drive device of the present embodiment will be described focusing on the differences from the first embodiment. Points not particularly specified are the same as those in the first embodiment, and the same reference numerals are given and detailed description thereof will be omitted.

As shown in FIG. 5, in the present embodiment, the outer peripheral support portion 25 includes a tubular inner peripheral surface 80a and a flow passage 83 through which a coolant flows. The flow passage 83 is formed at a position adjacent to the tubular inner peripheral surface 80a from an outer side in the radial direction R, along the tubular inner peripheral surface 80a excluding the area in the circumferential direction C in which the first notch portion 26A is formed. In the present embodiment, the stator 11 is configured to be cooled by the coolant (here, the cooling liquid) flowing through the flow passage 83. The flow passage 83 is, for example, a water jacket through which cooling water serving as a coolant flows. In the present embodiment, the vehicle drive device 100 does not include the oil supply portion 70. Further, in the present embodiment, the outer peripheral support portion 25 does not include the radial protruding portion 29.

The tubular inner peripheral surface 80a is formed so as to surround the stator core 12 from the outer side in the radial direction R, excluding the area in the circumferential direction C in which the first notch portion 26A is formed or over the entire circumferential direction C. That is, the tubular inner peripheral surface 80a is the support surface S facing the core outer peripheral surface 12a. The tubular inner peripheral surface 80a is formed in a cylindrical shape extending in the axial direction L. In the present embodiment, the core outer peripheral surface 12a is fitted to the tubular inner peripheral surface 80a by an interference fit (for example, press fitting or shrink fitting). Specifically, in the present embodiment, the stator core 12 does not have the protruding portion 14. The outer peripheral surface of the main body portion 13 provided in the stator core 12 is fitted to the tubular inner peripheral surface 80a by an interference fit.

In the present embodiment, as shown in FIG. 5, the tubular inner peripheral surface 80a is formed so as to surround the stator core 12 from the outer side in the radial direction R over the entire area in the circumferential direction C. That is, in the present embodiment, the first notch portion 26A is formed by notching only the outer side part of the outer peripheral support portion 25 in the radial direction R. Thus, in the present embodiment, the stator core 12 and the first output member 61 are not arranged so as to directly face each other in the radial direction R, and are arranged so as to face each other in the radial direction R via the outer peripheral support portion 25 (specifically, an inner case 81 described later). In the present embodiment, in the area in which the first notch portion 26A is formed, the core outer peripheral surface 12a is covered by the outer peripheral support portion 25 (specifically, the inner case 81) and is not exposed. In the present embodiment, the support surface S is formed on both sides of the first notch portion 26A along the circumferential direction C of the core outer peripheral surface 12a, and the support surface S is also formed in the area in the circumferential direction C in which the first notch portion 26A is formed.

In the present embodiment, the outer peripheral support portion 25 includes a rotary electric machine case 80 that surrounds the stator core 12 from the outer side in the radial direction R. The rotary electric machine case 80 is fixed to the case 2. In the example shown in FIG. 5, the outer peripheral support portion 25 (rotary electric machine case 80) includes the inner case 81 externally fitted to the stator core 12 and an outer case 82 externally fitted to the inner case 81. The inner case 81 is externally fitted to the stator core 12 by an interference fit, and the outer case 82 is externally fitted to the inner case 81 by an interference fit. The flow passage 83 is formed between the inner case 81 and the outer case 82. In the example shown in FIG. 5, the inner case 81 includes the tubular inner peripheral surface 80a. That is, the tubular inner peripheral surface 80a is formed by an inner peripheral surface of the inner case 81. As described above, in the present embodiment, the outer peripheral support portion 25 is provided with the inner case 81 that has the tubular inner peripheral surface 80a surrounding the stator core 12 from the outer side in the radial direction R and that is externally fitted to the stator core 12, the outer case 82 that is externally fitted to the inner case 81, and the flow passage 83 that is formed between the inner case 81 and the outer case 82 and through which the coolant flows.

In the example shown in FIG. 5, the inner case 81 is formed so as to be continuous over the entire circumferential direction C, whereas a notch portion in which the outer case 82 is notched over the entire arrangement area P in the axial direction L of the stator core 12 is formed in the outer case 82. By forming the notch portion only in the outer case 82 in this way, in the example shown in FIG. 5, the first notch portion 26A is formed by notching only the outer side part of the outer peripheral support portion 25 in the radial direction R. In the present embodiment, the outer peripheral support portion 25 includes a circumferential extending portion 84 that is formed so as to extend so as to be continuous in the circumferential direction C excluding an area of a part of the circumferential direction C (specifically, an area in which the first notch portion 26A is formed). In the example shown in FIG. 5, the outer case 82 includes the circumferential extending portion 84. The first notch portion 26A is formed between an end portion on one side of the circumferential extending portion 84 in the circumferential direction C and the end portion on the other side of the circumferential extending portion 84 in the circumferential direction C.

Here, as shown in FIG. 5, a virtual circle passing through an outer peripheral surface of the rotary electric machine case 80 (here, an outer peripheral surface of the outer case 82) as seen in the axial direction is referred to as a fourth virtual circle B4, and a virtual circle passing through an outer side end of the flow passage 83 in the radial direction R as seen in the axial direction is referred to as a third virtual circle B3. Both the third virtual circle B3 and the fourth virtual circle B4 are virtual circles in which the first axis A1 is set as a center as seen in the axial direction. In the present embodiment, at least a part of the first output member 61 (here, only the inner side portion in the radial direction R) is arranged on the inner side of the fourth virtual circle B4 in the radial direction R as seen in the axial direction. Further, in the present embodiment, at least a part of the first output member 61 (here, only the inner side portion in the radial direction R) is arranged on the inner side of the third virtual circle B3 in the radial direction R as seen in the axial direction. Thus, in the present embodiment, the arrangement area of the first output member 61 in the radial direction R overlaps the arrangement area of the flow passage 83 in the radial direction R. That is, the first output member 61 is arranged at the position in the circumferential direction C at which the flow passage 83 is not arranged so that the arrangement area of the first output member 61 in the radial direction R overlaps with the arrangement area of the flow passage 83 in the radial direction R.

Figure 6:
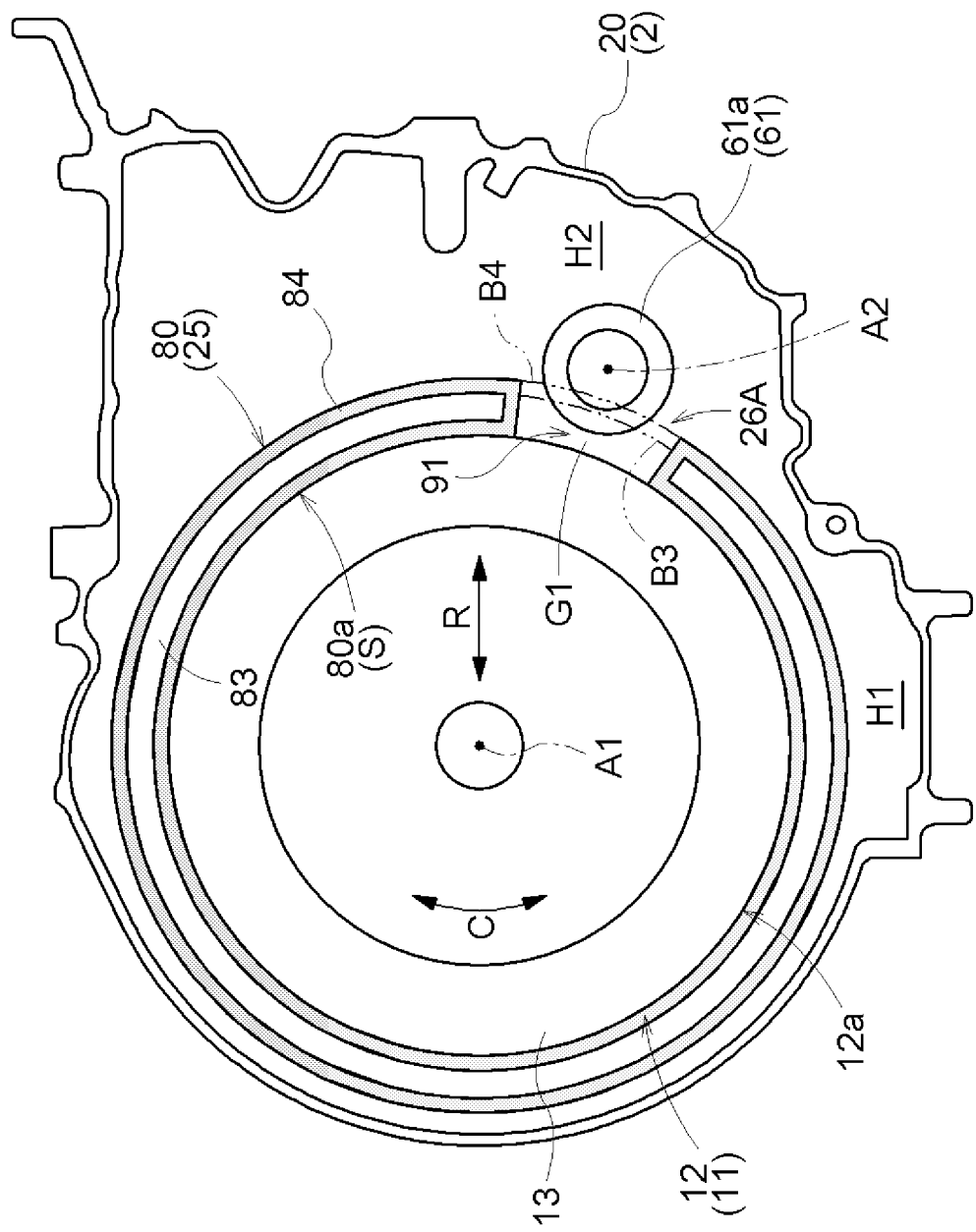
FIG. 6 is an axial view showing the support structure of the stator core according to another embodiment.

In the present embodiment, described as an example is a case in which the tubular inner peripheral surface 80a is formed so as to surround the stator core 12 from the outer side in the radial direction R over the entire area in the circumferential direction C. However, as in the example shown in FIG. 6, the tubular inner peripheral surface 80a may be configured so as to be formed so as to surround the stator core 12 from the outer side in the radial direction R, excluding the area in the circumferential direction C in which the first notch portion 26A is formed. In the example shown in FIG. 6, unlike the example shown in FIG. 5, the first notch portion 26A is formed by notching the entire area of the outer peripheral support portion 25 in the radial direction R. That is, in the example shown in FIG. 6, not only in the part corresponding to the outer case 82 in the example shown in FIG. 5 but also in the part corresponding to the inner case 81, a notch portion in which the part is notched over the entire area of the arrangement area P in the axial direction L of the stator core 12 is formed. In the example shown in FIG. 6, the stator core 12 and the first output member 61 are arranged so as to directly face each other in the radial direction R. In the example shown in FIG. 6, in the area in which the first notch portion 26A is formed, the core outer peripheral surface 12a is exposed without being covered by the outer peripheral support portion 25. In the example shown in FIG. 6, the support surface S is formed on both sides of the first notch portion 26A along the circumferential direction C of the core outer peripheral surface 12a, whereas the support surface S is not formed in the area in the circumferential direction C in which the first notch portion 26A is formed.

Other Embodiments

Next, other embodiments of the vehicle drive device will be described.

(1) In each of the above-described embodiments, described as an example is the configuration in which the stator support portion 24 includes the outer peripheral support portion 25 that supports the core outer peripheral surface 12a in the radial direction R. However, the present disclosure is not limited to such a configuration, and the stator support portion 24 may be configured to not include the outer peripheral support portion 25.

(2) In each of the above-described embodiments, described as an example is a configuration in which the first output member 61 includes the same diameter portion 61a having an outer diameter uniformly formed along the axial direction L, and the same diameter portion 61a faces the stator core 12 in the radial direction R in the entire arrangement area P of the stator core 12 in the axial direction L. However, the present disclosure is not limited to such a configuration, and a step portion, an inclined portion, or the like in which the outer diameter changes may be provided in a part of the first output member 61 that faces the stator core 12 in the radial direction R.

(3) In the above-described first embodiment, described as an example is the configuration in which as seen in the axial direction, a part of the first output member 61 is arranged so as to overlap the first virtual circle B1 passing through a center of a plurality of the insertion holes 16 formed in the protruding portions 14. However, the present disclosure is not limited to such a configuration, and the configuration may be such that the entire first output member 61 is arranged on the outer side in the radial direction R with respect to the first virtual circle B1, as seen in the axial direction. In this case, the configuration may be such that as seen in the axial direction, a part of the first output member 61 is arranged so as to overlap the second virtual circle B2 (see FIG. 3) passing through the outermost peripheral portion (outermost portion in the radial direction R, in other words, the outer side end in the radial direction R) of each of the protruding portions 14 (three protruding portions 14 in the above-described embodiment). That is, the configuration may be such that at least a part of the first output member 61 (here, only the inner side portion in the radial direction R) is arranged on the inner side of the second virtual circle B2 in the radial direction R as seen in the axial direction. The second virtual circle B2 is a virtual circle in which the first axis A1 is set as the center as seen in the axial direction. As shown in FIG. 3, the second virtual circle B2 is a virtual circle having a larger diameter than the first virtual circle B1. In the above-described embodiment, a part of the first output member 61 is arranged to overlap the first virtual circle B1 and a different part of the first output member 61 is arranged to overlap the second virtual circle B2 as seen in the axial direction. Here, the second virtual circle B2 corresponds to "a virtual circle passing through the outer side end in the radial direction at each of the protruding portions".

(4) In the above-described second embodiment, described as an example is the configuration in which at least a part of the first output member 61 is arranged on the inner side of the third virtual circle B3 in the radial direction R as seen in the axial direction. However, the present disclosure is not limited to such a configuration, and the configuration may be such that the entire first output member 61 is arranged on the outer side of the third virtual circle B3 in the radial direction R as seen in the axial direction. Even in such a case, it is preferable that the configuration is such that at least a part of the first output member 61 be arranged on the inner side of the fourth virtual circle B4 in the radial direction R as seen in the axial direction.

(5) In the above-described first embodiment, described as an example is the configuration in which the first output member 61 is arranged between the first protruding portion 14A and the first support part 25A in the circumferential direction C so that the first output member 61 extends in the axial direction L. However, the present disclosure is not limited to such a configuration, and for example, the configuration may be such that the first output member 61 is arranged between the first protruding portion 14A and the second support part 25B in the circumferential direction C so as to extend in the axial direction L.

(6) In each of the above-described embodiments, described as an example is a configuration in which the first output member 61 is arranged on the lower side V2 of the first axis A1 and on the upper side V1 of the lowermost portion of the rotary electric machine 1. However, the present disclosure is not limited to such a configuration, and for example, the configuration may be such that the first output member 61 is arranged on the upper side V1 of the first axis A1 and on the lower side V2 of an uppermost portion of the rotary electric machine 1.

(7) In the above-described first embodiment, described as an example is the configuration in which the oil supply portion 70 includes the supply pipe 71 that extends along the axial direction L and that is arranged so as to face the stator 11 in the radial direction R. However, the present disclosure is not limited to such a configuration, and for example, the configuration may be such that the oil supply portion 70 includes an oil passage formed in the peripheral wall portion 20 so as to extend along the axial direction L instead of the supply pipe 71, and the oil passage includes a supply hole for supplying the oil toward the stator 11. In this case, it is preferable that the stator support portion 24 be provided so as to avoid an area in which the stator core 12 and the oil passage face each other in the radial direction R, and the outer peripheral support portion 25 include a notch portion formed in an area in the circumferential direction C overlapping the area.

(8) In the above-described first embodiment, described as an example is the configuration in which the vehicle drive device 100 includes the oil supply portion 70 that supplies oil for cooling to the stator 11. However, the present disclosure is not limited to such a configuration, and for example, as in the second embodiment described above, the configuration may be such that the vehicle drive device 100 includes a cooling water supply portion that supplies cooling water to the stator 11 instead of the oil supply portion 70, and the stator 11 is cooled by the cooling water supplied to the stator 11.

(9) In each of the above-described embodiments, described as an example is the configuration in which the differential case portion 52 includes the opening portion 52a that communicates the inside and the outside of the differential case portion 52. However, the present disclosure is not limited to such a configuration, and for example, the configuration may be such that oil is supplied from an oil passage formed inside the first output member 61 to the inside of the differential case portion 52.

(10) In each of the above-described embodiments, described as an example is the configuration in which the gear group 53 that configures the differential gear mechanism 5 is arranged on the axial first side L1 with respect to the stator 11. However, the present disclosure is not limited to such a configuration, and the configuration may be such that the gear group 53 is arranged so as to overlap the stator 11 as seen in the radial direction along the radial direction R in an area of a part in the circumferential direction C, that is, the configuration may be such that an arrangement area of the gear group 53 in the axial direction L and the arrangement area of the stator 11 in the axial direction L overlap.

(11) In each of the above-described embodiments, described as an example is the configuration in which the vehicle drive device 100 includes the counter gear mechanism 4. However, the present disclosure is not limited to such a configuration, and the configuration may be such that the vehicle drive device 100 does not include the counter gear mechanism 4. In this case, for example, the configuration may be such that instead of the counter gear mechanism 4, an idler gear that meshes with both the input gear 30 and the differential input gear 51 is provided, or the configuration may be such that the input gear 30 meshes with the differential input gear 51.

(12) The configuration disclosed in each of the embodiments described above can be applied in combination with the configurations disclosed in other embodiments (including combinations of embodiments described as the other embodiments) as long as there is no contradiction. Regarding the other configurations, the embodiments disclosed herein are merely exemplary in all respects. Thus, various modifications can be made as appropriate without departing from the scope of the present disclosure.

[Summary of Present Embodiment]

Hereinafter, the outline of the vehicle drive device described above will be described.

A vehicle drive device (100) includes: a rotary electric machine (1) including a stator (11) on an outer side of a rotor (10) in a radial direction (R); an input member (3) drivingly connected to the rotor (10); a differential gear mechanism (5) in which a drive force from the rotary electric machine (1) that is transmitted via the input member (3) is distributed to a first wheel (W1) and a second wheel (W2); and a case (2) that accommodates the rotary electric machine (1), the input member (3), and the differential gear mechanism (5), in which the rotary electric machine (1) and the input member (3) are arranged on a first axis (A1), the differential gear mechanism (5) is arranged on a second axis (A2) different from the first axis (A1), the input member (3) and the differential gear mechanism (5) include a part arranged on an axial first side (L1) that is one side in an axial direction (L) with respect to the rotary electric machine (1), an opposite side in the axial direction (L) from the axial first side (L1) is set as an axial second side (L2), the differential gear mechanism (5) is connected to the first wheel (W1) via a shaft member (61) including a part that is arranged on the second axis (A2) on the axial second side (L2) with respect to the differential gear mechanism (5), the case (2) includes an outer peripheral support portion (25) that is formed along a core outer peripheral surface (12a) that is an outer peripheral surface of a stator core (12) included in the stator (11), and that supports the core outer peripheral surface (12a) in the radial direction (R), a notch portion (26A) in which the outer peripheral support portion (25) is notched over an entire area of an arrangement area (P) of the stator core (12) in the axial direction (L) is formed in the outer peripheral support portion (25), and the notch portion (26A) is arranged at a position that is between the core outer peripheral surface (12a) and the shaft member (61) in the radial direction (R), and that overlaps the shaft member (61) as seen in the radial direction along the radial direction (R).

In this configuration, since each of the input member (3) and the differential gear mechanism (5) includes a part arranged on the axial first side (L1) with respect to the rotary electric machine (1), a power transmission mechanism that transmits a drive force between the input member (3) and the differential gear mechanism (5) can be arranged in a space on the axial first side (L1) with respect to the rotary electric machine (1). Since the differential gear mechanism (5) includes a part arranged on the axial first side (L1) with respect to a rotary electric machine (1), by arranging the differential gear mechanism (5) closer to the axial first side (L1), it is easy to avoid that an interference between the differential gear mechanism (5) and the rotary electric machine (1) hinders the shortening of an inter-axial distance between the first axis (A1) in which the rotary electric machine (1) is arranged and the second axis (A2) in which the differential gear mechanism (5) is arranged.

Further, in the present configuration, since the case (2) includes the outer peripheral support portion (25), the stator core (12) can be supported by the outer peripheral support portion (25). Thereby, for example, centering at the time of assembling the stator core (12) can be appropriately performed, and even if the stator core (12) fixed to the case (2) is tilted, the amount of tilt can be suppressed to a small value. Alternatively, when the outer peripheral support portion (25) is configured to be in constant contact with the core outer peripheral surface (12a), the stator core (12) can be appropriately held. In the present configuration, the notch portion (26A) formed in the outer peripheral support portion (25) is arranged at a position that is between the core outer peripheral surface (12a) and the shaft member (61) in the radial direction (R) and that overlaps the shaft member (61) as seen in the radial direction. Thus, it is easy to arrange the core outer peripheral surface (12a) closer to the shaft member (61) in the radial direction (R) while providing the outer peripheral support portion (25), and it is easy to keep the inter-axial distance between the first axis (A1) and the second axis (A2) short. Thus, according to the present configuration, it is easy to reduce the size of the dimension in the radial direction (R) of the vehicle drive device (100). By keeping the distance between the first axis (A1) and the second axis (A2) short in this way, it is possible to reduce the size of the case (2) as seen in the axial direction and also reduce the weight of the case (2).

Here, it is preferable that an arrangement area of the shaft member (61) in the radial direction (R) overlap an arrangement area of the outer peripheral support portion (25) in the radial direction (R).

According to this configuration, by arranging the shaft member (61) close to the core outer peripheral surface (12a) to a degree in which the arrangement area of the shaft member (61) in the radial direction (R) overlaps the arrangement area of the outer peripheral support portion (25) in the radial direction (R), the inter-axial distance between the first axis (A1) and the second axis (A2) can be shortened.

As described above, in a configuration in which an arrangement area of the shaft member (61) in the radial direction (R) overlaps an arrangement area of the outer peripheral support portion (25) in the radial direction (R), it is preferable that the case (2) include a peripheral wall portion (20) that surrounds the stator (11) from the outer side in the radial direction (R), the outer peripheral support portion (25) include a support surface (S) that faces the core outer peripheral surface (12a), and a radial protruding portion (29) that protrudes from an inner peripheral surface of the peripheral wall portion (20) to an inner side in the radial direction (R) and in which the support surface (S) is formed on an end portion on the inner side in the radial direction (R), and the arrangement area of the shaft member (61) in the radial direction (R) overlap an arrangement area of the radial protruding portion (29) in the radial direction (R).

According to this configuration, by making the arrangement area of the shaft member (61) in the radial direction (R) overlap with the arrangement area of the radial protruding portion (29) in the radial direction (R), even when the outer peripheral support portion (25) includes the radial protruding portion (29), by arranging the shaft member (61) close to the core outer peripheral surface (12a), the inter-axial distance between the first axis (A1) and the second axis (A2) can be shortened.

In the vehicle drive device (100) having each of the above configurations, it is preferable that the stator core (12) include a main body portion (13) that extends in the axial direction (L) and that has a cylindrical shape, and a plurality of protruding portions (14) protruding to the outer side in the radial direction (R) with respect to the main body portion (13), the protruding portions (14) be arranged so as to be dispersed in a circumferential direction (C) along an outer peripheral surface of the main body portion (13), and be each fixed to a fixing portion (27) formed in the case (2), one protruding portion (14) among of the protruding portions (14) be set as a target protruding portion (14A), and one of two support parts (25A, 25B) arranged on both sides sandwiching the first notch portion (26A) of the outer peripheral support portion (25) in the circumferential direction (C) be set as the target support part (25A), and the shaft member (61) be arranged between the target protruding portion (14A) and the target support part (25A) in the circumferential direction (C) so as to extend in the axial direction (L).

According to this configuration, even when the protruding portion (14) for fixing the stator core (12) to the case (2) is provided, by arranging the shaft member (61) close to the core outer peripheral surface (12a) while avoiding interference of the shaft member (61) and the target protruding portion (14A), the inter-axial distance between the first axis (A1) and the second axis (A2) can be shortened.

As described above, in a configuration in which the shaft member (61) is arranged between the target protruding portion (14A) and the target support part (25A) in the circumferential direction (C) so as to extend in the axial direction (L), it is preferable that at least a part of the shaft member (61) be arranged on an inner side in the radial direction (R) with respect to a virtual circle (B2) passing through an outer side end of each of the protruding portions (14) in the radial direction (R), as seen in the axial view along the axial direction (L).

According to this configuration, while providing the protruding portions (14) for fixing the stator core (12) to the case (2), by arranging the core outer peripheral surface (12a) and the shaft member (61) closer in the radial direction (R) to a degree in which at least a part of the shaft member (61) is arranged on the inner side in the radial direction (R) with respect to the virtual circle (B2) as seen in the axial direction, the inter-axial distance between the first axis (A1) and the second axis (A2) can be kept short.

In the vehicle drive device (100) having each of the above configurations, it is preferable that an oil supply portion (70) that supplies oil for cooling to the stator (11) be provided, the oil supply portion (70) include a supply pipe (71) that extends along the axial direction (L) and that is arranged so as to face the stator (11) in the radial direction (R), a flow passage (72) through which oil flows be formed inside the supply pipe (71) and the supply pipe (71) include a supply hole (73) that supplies the oil toward the stator (11), the notch portion (26A) be set as a first notch portion (26A), and a second notch portion (26B) in which the outer peripheral support portion (25) is notched over an entire area of the arrangement area (P) of the stator core (12) in the axial direction (L) be formed at a position different from the first notch portion (26A) in the circumferential direction (C) in the outer peripheral support portion (25), and the second notch portion (26B) be arranged at a position that is between the core outer peripheral surface (12a) and the supply pipe (71) in the radial direction (R), and that overlaps the supply pipe (71) as seen in the radial direction (R).

According to this configuration, the stator (11) can be cooled by supplying the oil flowing through the flow passage (72) formed inside the supply pipe (71), from the supply hole (73) to the stator (11). In the present configuration, the second notch portion (26B) formed in the outer peripheral support portion (25) is arranged at a position that is between the core outer peripheral surface (12a) and the supply pipe (71) in the radial direction (R) and that overlaps the supply pipe (71) as seen in the radial direction. Thus, while providing the outer peripheral support portion (25), it is easy to supply oil for cooling to the stator (11) so that heat exchange with the core outer peripheral surface (12a) is appropriately performed, and it is easy to properly secure the cooling performance of the stator (11).

As described above, in a configuration in which an arrangement area of the shaft member (61) in the radial direction (R) overlaps an arrangement area of the outer peripheral support portion (25) in the radial direction (R), it is preferable that excluding an area in a circumferential direction (C) in which the notch portion (26A) is formed or over an entire area in the circumferential direction (C), the outer peripheral support portion (25) include a tubular inner peripheral surface (80a) that surrounds the stator core (12) from the outer side in the radial direction (R) and includes a flow passage (83) in which a coolant flows through, the flow passage (83) be formed at a position adjacent to the tubular inner peripheral surface (80a) from the outer side in the radial direction (R), along the tubular inner peripheral surface (80a) excluding the area in the circumferential direction (C) in which the notch portion (26A) is formed, and the arrangement area of the shaft member (61) in the radial direction (R) overlap an arrangement area of the flow passage (83) in the radial direction (R).

According to this configuration, the stator (11) can be cooled by the coolant flowing through the flow passage (83). In the present configuration, since the flow passage (83) is not formed in the area in the circumferential direction (C) in which the notch portion (26A) is formed, by arranging the shaft member (61) close to the core outer peripheral surface (12a) to a degree in which the arrangement area of the shaft member (61) in the radial direction (R) overlaps the arrangement area of the flow passage (83) in the radial direction (R), the inter-axial distance between the first axis (A1) and the second axis (A2) can be shortened.

A vehicle drive device (100) includes: a rotary electric machine (1) including a stator (11) on an outer side of a rotor (10) in a radial direction (R); an input member (3) drivingly connected to the rotor (10); a differential gear mechanism (5) in which a drive force from the rotary electric machine (1) that is transmitted via the input member (3) is distributed to a first wheel (W1) and a second wheel (W2); and a case (2) that accommodates the rotary electric machine (1), the input member (3), and the differential gear mechanism (5), in which the rotary electric machine (1) and the input member (3) are arranged on a first axis (A1), the differential gear mechanism (5) is arranged on a second axis (A2) different from the first axis (A1), the input member (3) and the differential gear mechanism (5) include a part arranged on an axial first side (L1) that is one side in an axial direction (L) with respect to the rotary electric machine (1), an opposite side in the axial direction (L) from the axial first side (L1) is set as an axial second side (L2), the differential gear mechanism (5) is connected to the first wheel (W1) via a shaft member (61) including a part that is arranged on the second axis (A2) on the axial second side (L2) with respect to the differential gear mechanism (5), the case (2) includes an outer peripheral support portion (25) that is formed along a core outer peripheral surface (12a) that is an outer peripheral surface of a stator core (12) included in the stator (11), and that supports the core outer peripheral surface (12a) in the radial direction (R), the outer peripheral support portion (25) is provided with an inner case (81) that has a tubular inner peripheral surface (80a) surrounding the stator core (12) from the outer side in the radial direction (R) and that is externally fitted to the stator core (12), an outer case (82) that is externally fitted to the inner case (81), and a flow passage (83) that is formed between the inner case (81) and the outer case (82) and through which the coolant flows, a notch portion (26A) in which the outer case (82) is notched over an entire area of an arrangement area (P) of the stator core (12) in the axial direction (L) is formed in the outer case (82), and the notch portion (26A) is arranged at a position that is between the core outer peripheral surface (12a) and the shaft member (61) in the radial direction (R), and that overlaps the shaft member (61) as seen in the radial direction along the radial direction (R).

In this configuration, since each of the input member (3) and the differential gear mechanism (5) includes a part arranged on the axial first side (L1) with respect to the rotary electric machine (1), a power transmission mechanism that transmits a drive force between the input member (3) and the differential gear mechanism (5) can be arranged in a space on the axial first side (L1) with respect to the rotary electric machine (1). Since the differential gear mechanism (5) includes a part arranged on the axial first side (L1) with respect to a rotary electric machine (1), by arranging the differential gear mechanism (5) closer to the axial first side (L1), it is easy to avoid that an interference between the differential gear mechanism (5) and the rotary electric machine (1) hinders the shortening of an inter-axial distance between the first axis (A1) in which the rotary electric machine (1) is arranged and the second axis (A2) in which the differential gear mechanism (5) is arranged.

Further, in the present configuration, since the case (2) includes the outer peripheral support portion (25), the stator core (12) can be supported by the outer peripheral support portion (25). Thereby, for example, centering at the time of assembling the stator core (12) can be appropriately performed, and even if the stator core (12) fixed to the case (2) is tilted, the amount of tilt can be suppressed to a small value. Alternatively, when the outer peripheral support portion (25) is configured to be in constant contact with the core outer peripheral surface (12a), the stator core (12) can be appropriately held. In the present configuration, the notch portion (26A) formed in the outer case (82) is arranged at a position that is between the core outer peripheral surface (12a) and the shaft member (61) in the radial direction (R) and that overlaps the shaft member (61) as seen in the radial direction. Thus, while the support portion having a configuration in which a flow passage (83) through which the coolant flows is formed between the inner case (81) and the outer case (82) is used as the outer peripheral support portion (25), it is easy to arrange the core outer peripheral surface (12a) closer to the shaft member (61) in the radial direction (R), and it is easy to keep the inter-axial distance between the first axis (A1) and the second axis (A2) short. Thus, according to the present configuration, it is easy to reduce the size of the dimension in the radial direction (R) of the vehicle drive device (100). By keeping the distance between the first axis (A1) and the second axis (A2) short in this way, it is possible to reduce the size of the case (2) as seen in the axial direction and also reduce the weight of the case (2).

In the configuration in which the notch portion (26A) is formed in the outer case (82) as described above, it is preferable that an arrangement area of the shaft member (61) in the radial direction (R) overlap an arrangement area of the flow passage (83) in the radial direction (R).

According to this configuration, by arranging the shaft member (61) close to the core outer peripheral surface (12a) to a degree in which the arrangement area of the shaft member (61) in the radial direction (R) overlaps the arrangement area of the flow passage (83) in the radial direction (R), the inter-axial distance between the first axis (A1) and the second axis (A2) can be shortened.

As described above, in the configuration in which the stator core (12) is surrounded by the tubular inner peripheral surface (80a) from the outer side in the radial direction (R), it is preferable that the core outer peripheral surface (12a) be fitted to the tubular inner peripheral surface (80a) by an interference fit.

According to this configuration, even if the protruding portion (14) protruding to the outer side in the radial direction (R) with respect to the main body portion (13) is not provided, the stator core (12) can be held by the outer peripheral support portion (25), and the stator core (12) can be fixed to the case (2). In the present configuration, compared to the case in which the core outer peripheral surface (12a) is fitted to the tubular inner peripheral surface (80a) by an interference fit, it is possible to increase the heat exchange efficiency between the coolant flowing through the flow passage (83) and the core outer peripheral surface (12a), and it is possible to improve the cooling efficiency of the stator (11).

Further, it is preferable that the outer peripheral support portion (25) include a circumferential extending portion (84) formed so as to extend so as to be continuous in the circumferential direction (C) excluding an area of a part in the circumferential direction (C), and the notch portion (26A) be formed between an end portion on one side of the circumferential extending portion (84) in the circumferential direction (C) and an end portion on another side of the circumferential extending portion (84) in the circumferential direction (C).

According to this configuration, while the notch portion (26A) is formed in the outer peripheral support portion (25), the support rigidity of the stator core (12) by the outer peripheral support portion (25) can be ensured to be high due to the presence of the circumferential extending portion (84).

In the vehicle drive device (100) having each of the above configurations, it is preferable that the outer peripheral support portion (25) include a support surface (S) facing the core outer peripheral surface (12a), and the support surface (S) be formed on both sides sandwiching the notch portion (26A) along the circumferential direction (C) of the core outer peripheral surface (12a).

According to this configuration, while the notch portion (26A) is formed in the outer peripheral support portion (25), the stator core (12) can be appropriately supported by the support surfaces (S) formed on both sides sandwiching the notch portion (26A).

Further, it is preferable that the outer peripheral support portion (25) include a part arranged on a lower side (V2) of the rotary electric machine (1).

According to this configuration, the movement of the stator core (12) to the lower side (V2) by the action of gravity can be restricted by the outer peripheral support portion (25). Thus, for example, centering at the time of assembling the stator core (12) can be appropriately performed, and the inclination of the stator core (12) fixed to the case (2) can be appropriately suppressed.

A vehicle drive device (100), a vehicle drive device (100) includes: a rotary electric machine (1) including a stator (11) on an outer side of a rotor (10) in a radial direction (R); an input member (3) drivingly connected to the rotor (10); a differential gear mechanism (5) in which a drive force from the rotary electric machine (1) that is transmitted via the input member (3) is distributed to a first wheel (W1) and a second wheel (W2); and a case (2) that accommodates the rotary electric machine (1), the input member (3), and the differential gear mechanism (5), in which the rotary electric machine (1) and the input member (3) are arranged on a first axis (A1), the differential gear mechanism (5) is arranged on a second axis (A2) different from the first axis (A1), the input member (3) and the differential gear mechanism (5) include a part arranged on an axial first side (L1) that is one side in an axial direction (L) with respect to the rotary electric machine (1), an opposite side in the axial direction (L) from the axial first side (L1) is set as an axial second side (L2), the differential gear mechanism (5) is connected to the first wheel (W1) via a shaft member (61) including a part that is arranged on the second axis (A2) on the axial second side (L2) with respect to the differential gear mechanism (5), the stator core (12) provided in the stator (11) includes a main body portion (13) that extends in the axial direction (L) and that has a cylindrical shape, and a plurality of protruding portions (14) protruding to an outer side in the radial direction (R) with respect to the main body portion (13), the protruding portions (14) are arranged so as to be dispersed in a circumferential direction (C) along an outer peripheral surface of the main body portion (13), and are each fixed to a fixing portion (27) formed in the case (2), and at least a part of the shaft member (61) is arranged on an inner side in the radial direction (R) with respect to a virtual circle (B2) passing through an outer side end of each of the protruding portions (14) in the radial direction (R), as seen in the axial direction along the axial direction (L).

In this configuration, since each of the input member (3) and the differential gear mechanism (5) includes a part arranged on the axial first side (L1) with respect to the rotary electric machine (1), a power transmission mechanism that transmits a drive force between the input member (3) and the differential gear mechanism (5) can be arranged in a space on the axial first side (L1) with respect to the rotary electric machine (1). Since the differential gear mechanism (5) includes a part arranged on the axial first side (L1) with respect to a rotary electric machine (1), by arranging the differential gear mechanism (5) closer to the axial first side (L1), it is easy to avoid that an interference between the differential gear mechanism (5) and the rotary electric machine (1) hinders the shortening of an inter-axial distance between the first axis (A1) in which the rotary electric machine (1) is arranged and the second axis (A2) in which the differential gear mechanism (5) is arranged.

Further, in the present configuration, at least a part of the shaft member (61) is arranged on the inner side in the radial direction (R) with respect to the virtual circle (B2) passing through the outer side end of each of the protruding portions (14) in the radial direction (R), as seen in the axial direction. Thus, while providing the protruding portions (14) for fixing the stator core (12) to the case (2), by arranging the core outer peripheral surface (12a) and the shaft member (61) closer in the radial direction (R) to a degree in which at least a part of the shaft member (61) is arranged on the inner side in the radial direction (R) with respect to the virtual circle (B2) as seen in the axial direction, the inter-axial distance between the first axis (A1) and the second axis (A2) can be kept short. Thus, according to the present configuration, it is easy to reduce the size of the dimension in the radial direction (R) of the vehicle drive device (100). By keeping the distance between the first axis (A1) and the second axis (A2) short in this way, it is possible to reduce the size of the case (2) as seen in the axial direction and also reduce the weight of the case (2).

As described above, in the configuration in which at least a part of the shaft member (61) is arranged on an inner side in the radial direction (R) with respect to a virtual circle (B2) passing through an outer side end of each of the protruding portions (14) in the radial direction (R), as seen in the axial direction, it is preferable that an insertion hole (16) through which a fastening member (28) for fixing the stator core (12) to the fixing portion (27) be formed so as to pass through each of the protruding portions (14) in the axial direction (L), and as seen in the axial direction, at least a part of the shaft member (61) be arranged on the inner side in the radial direction (R) with respect to a virtual circle (B1) passing through a center of a plurality of the insertion holes (16) formed in the protruding portions (14).

According to this configuration, by arranging the core outer peripheral surface (12a) and the shaft member (61) closer in the radial direction (R) to a degree in which at least a part of the shaft member (61) is arranged on the inner side in the radial direction (R) with respect to the virtual circle (B1) as seen in the axial direction, the inter-axial distance between the first axis (A1) and the second axis (A2) can be kept short. Further, according to the present configuration, the stator core (12) can be fastened and fixed to the fixing portion (27) of the case (2) by using the fastening member (28). Thus, when the present configuration is adopted to the case in which the case (2) is provided with the outer peripheral support portion (25), the effect on the fixing structure of the stator core (12) with respect to the case (2) can be kept small, and the notch portion (26A) of the outer peripheral support portion (25) can be formed.

In the vehicle drive device (100) having each of the above configurations, it is preferable that the shaft member (61) be arranged in a space (H2) inside the case (2), the space (H2) communicating with an accommodation space (H1) of the rotary electric machine (1).

According to this configuration, the core outer peripheral surface (12a) and the shaft member (61) can be arranged so as to face each other in the radial direction (R) (for example, so as to directly face each other) without interposing another member such as the case (2) between the core outer peripheral surface (12a) and the shaft member (61). Thus, it is easy to keep the inter-axial distance between the first axis (A1) and the second axis (A2) short.

Further, it is preferable that the differential gear mechanism (5) include a gear group (53) and a differential case portion (52) surrounding the gear group (53), and the differential case portion (52) include an opening portion (52a) that communicates an inside and an outside of the differential case portion (52).

According to this configuration, the oil present inside the case (2) (for example, the oil scraped up by the differential input gear (51)) can be introduced from the opening portion (52a) to the inside of the differential case portion (52) to perform lubrication of the gear group (53). Unlike such a configuration, for example, it is possible to consider a configuration in which an in-shaft oil passage extending inside the shaft member (61) in the axial direction (L) and a radial oil passage communicating the outer peripheral surface of the shaft member (61) and the in-shaft oil passage are formed, and in which the oil supplied from the radial oil passage to the in-shaft oil passage is supplied from the in-shaft oil passage to the inside of the differential case portion (52). However, in this case, it is necessary to provide on the outer side in the radial direction with respect to the shaft member (61), an oil supply structure for supplying oil to the radial oil passage, and there is a possibility that interference between the oil supply structure and the rotary electric machine (1) hinders the shortening of the inter-axial distance between the first axis (A1) and the second axis (A2). On the other hand, according to the present configuration, since it is not necessary to provide such an oil supply structure, it is easy to keep the inter-axial distance between the first axis (A1) and the second axis (A2) short.

Moreover, it is preferable that a counter gear mechanism (4) for drivingly connecting the input member (3) and the differential gear mechanism (5) be arranged on a third axis (A3) different from the first axis (A1) and the second axis (A2).

According to this configuration, compared to the case in which the input member (3) and the differential gear mechanism (5) are drivingly connected without interposing the counter gear mechanism (4), it becomes easy to set the gear ratio between the input member (3) and the differential gear mechanism (5) to a desired value.

Further, it is preferable that the shaft member (61) be arranged on a lower side (V2) of the first axis (A1) and on an upper side (V1) of a lowermost portion of the rotary electric machine (1).

According to this configuration, when the rotary electric machine (1) is arranged in the case (2) forming an accommodation space close to a rectangular parallelepiped, the shaft member (61) can be arranged by using the dead space formed in a corner part on the lower side (V2) of the rectangular parallelepiped space. Thus, by keeping the inter-axial distance between the first axis (A1) and the second axis (A2) short, it is possible to decrease the size of the dimensions of the case (2) as seen in the axial direction while balancing decreasing the size of the dimensions in the vertical direction (V) and decreasing the size of the dimensions in the horizontal direction (horizontal direction as seen in the axial direction).

Further, it is preferable that the gear group (53) that configures the differential gear mechanism (5) be arranged on the axial first side (L1) with respect to the stator (11).

According to this configuration, the gear group (53) formed with a relatively large diameter in the differential gear mechanism (5) can be arranged at a position different from the stator (11) in the axial direction (L). Thus, it is easy to avoid that the interference between the differential gear mechanism (5) and the rotary electric machine (1) hinders the shortening of the inter-axial distance between the first axis (A1) and the second axis (A2). Thus, for example, the first axis (A1) and the second axis (A2) can be arranged close to each other to a degree in which the stator (11) overlaps the gear group (53) as seen in the axial direction.

The vehicle drive device according to the present disclosure only needs to be capable of exerting at least one of the above-described effects.

DESCRIPTION OF REFERENCE NUMERALS

1: rotary electric machine, 2: case, 3: input member, 4: counter gear mechanism, 5: differential gear mechanism, 10:

rotor, 11: stator, 12: stator core, 12*a*: core outer peripheral surface, 13: main body portion, 14: protruding portion, 14A: first protruding portion (target protruding portion), 16: insertion hole, 24: stator support portion, 25: outer peripheral support portion, 25A: first support part (support part, target support part), 25B: second support part (support part), 26A: first notch portion (notch portion), 26B: second notch portion, 28: fastening member, 29: radial protruding portion, 52: differential case portion, 52*a*: opening portion, 53: gear group, 61: first output member (shaft member), 61*a*: same diameter portion, 70: oil supply portion, 71: supply pipe, 72: flow passage, 73: supply hole, 80*a*: tubular inner peripheral surface, 81: inner case, 82: outer case, 83: flow passage, 84: circumferential extending portion, 91: first facing area, 92: second facing area, 100: vehicle drive device, A1: first axis, A2: second axis, A3: third axis, B1: first virtual circle (the virtual circle passing through the center of the insertion holes formed in the protruding portions), B2: second virtual circle (the virtual circle passing through the outer side end in the radial direction at each of the protruding portions), C: circumferential direction, H1: first space (the accommodation space of the rotary electric machine), H2: second space (the space communicating with the accommodation space of the rotary electric machine), L: axial direction, L1: axial first side, L2: axial second side, P: arrangement area, R: radial direction, S: support surface, V1: upper side, V2: lower side, W1: first wheel, W2: second wheel

The invention claimed is:

1. vehicle drive device comprising:
   a rotary electric machine including a stator on an outer side of a rotor in a radial direction;
   an input member drivingly connected to the rotor;
   a differential gear mechanism in which a drive force from the rotary electric machine that is transmitted via the input member is distributed to a first wheel and a second wheel; and
   a case that accommodates the rotary electric machine, the input member, and the differential gear mechanism, wherein
   the rotary electric machine and the input member are arranged on a first axis,
   the differential gear mechanism is arranged on a second axis different from the first axis,
   the input member and the differential gear mechanism include a part arranged on an axial first side that is one side in an axial direction with respect to the rotary electric machine,
   an opposite side in the axial direction from the axial first side is set as an axial second side,
   the differential gear mechanism is connected to the first wheel via a shaft member including a part that is arranged on the second axis on the axial second side with respect to the differential gear mechanism,
   the case includes an outer peripheral support portion that is formed along a core outer peripheral surface that is an outer peripheral surface of a stator core included in the stator, and that supports the core outer peripheral surface in the radial direction,
   a notch portion in which the outer peripheral support portion is notched over an entire area of an arrangement area of the stator core in the axial direction is formed in the outer peripheral support portion, and
   the notch portion is arranged at a position that is between the core outer peripheral surface and the shaft member in the radial direction, and that overlaps the shaft member as seen in the radial direction along the radial direction.

2. The vehicle drive device according to claim 1, wherein an arrangement area of the shaft member in the radial direction overlaps an arrangement area of the outer peripheral support portion in the radial direction.

3. The vehicle drive device according to claim 2, wherein
   the case includes a peripheral wall portion that surrounds the stator from the outer side in the radial direction,
   the outer peripheral support portion includes a support surface that faces the core outer peripheral surface, and a radial protruding portion that protrudes from an inner peripheral surface of the peripheral wall portion to an inner side in the radial direction and in which the support surface is formed on an end portion on the inner side in the radial direction, and
   the arrangement area of the shaft member in the radial direction overlaps an arrangement area of the radial protruding portion in the radial direction.

4. The vehicle drive device according to claim 2, wherein
   over an area in a circumferential direction excluding an area in which the notch portion is formed or over an entire area in the circumferential direction, the outer peripheral support portion includes a tubular inner peripheral surface that surrounds the stator core from the outer side in the radial direction and includes a flow passage in which a coolant flows through,
   the flow passage is formed at a position adjacent to the tubular inner peripheral surface from the outer side in the radial direction, along the tubular inner peripheral surface excluding the area in the circumferential direction in which the notch portion is formed, and
   the arrangement area of the shaft member in the radial direction overlaps an arrangement area of the flow passage in the radial direction.

5. The vehicle drive device according to claim 4, wherein the core outer peripheral surface is fitted to the tubular inner peripheral surface by an interference fit.

6. The vehicle drive device according to claim 1, wherein
   the stator core includes a main body portion that extends in the axial direction and that has a cylindrical shape, and a plurality of protruding portions protruding to the outer side in the radial direction with respect to the main body portion,
   the protruding portions are arranged so as to be dispersed in a circumferential direction along an outer peripheral surface of the main body portion, and are each fixed to a fixing portion formed in the case,
   one protruding portion among the protruding portions is set as a target protruding portion, and one of two support parts that sandwich the notch portion in the circumferential direction is set as a target support part, and
   the shaft member is arranged between the target protruding portion and the target support part in the circumferential direction so as to extend in the axial direction.

7. The vehicle drive device according to claim 6, wherein at least a part of the shaft member is arranged on an inner side in the radial direction with respect to a virtual circle passing through an outer side end of each of the protruding portions in the radial direction, as seen in the axial direction along the axial direction.

8. The vehicle drive device according to claim 7, wherein
   an insertion hole through which a fastening member for fixing the stator core to the fixing portion is formed so as to pass through each of the protruding portions in the axial direction, and
   as seen in the axial direction, at least a part of the shaft member is arranged on the inner side in the radial direction with respect to a virtual circle passing through a center of a plurality of the insertion holes formed in the protruding portions.

9. The vehicle drive device according to claim 1, further comprising an oil supply portion that supplies oil for cooling to the stator, wherein
the oil supply portion includes a supply pipe that extends along the axial direction and that is arranged so as to face the stator in the radial direction,
a flow passage through which oil flows is formed inside the supply pipe and the supply pipe includes a supply hole that supplies the oil toward the stator,
the notch portion is set as a first notch portion, and a second notch portion in which the outer peripheral support portion is notched over an entire area of the arrangement area of the stator core in the axial direction is formed at a position different from the first notch portion in the circumferential direction in the outer peripheral support portion, and
the second notch portion is arranged at a position that is between the core outer peripheral surface and the supply pipe in the radial direction, and that overlaps the supply pipe as seen in the radial direction.

10. The vehicle drive device according to claim 1, wherein
the outer peripheral support portion includes a circumferential extending portion formed so as to extend so as to be continuous in the circumferential direction excluding an area of a part in the circumferential direction, and
the notch portion is formed between an end portion on one side of the circumferential extending portion in the circumferential direction and an end portion on another side of the circumferential extending portion in the circumferential direction.

11. The vehicle drive device according to claim 1, wherein
the outer peripheral support portion includes a support surface facing the core outer peripheral surface, and
the support surface is formed on both sides sandwiching the notch portion along the circumferential direction of the core outer peripheral surface.

12. The vehicle drive device according to claim 1, wherein the outer peripheral support portion includes a part arranged on a lower side of the rotary electric machine.

13. The vehicle drive device according to claim 1, wherein the shaft member is arranged in a space inside the case, the space communicating with an accommodation space of the rotary electric machine.

14. The vehicle drive device according to claim 1, wherein
the differential gear mechanism includes a gear group and a differential case portion surrounding the gear group, and
the differential case portion includes an opening portion that communicates an inside and an outside of the differential case portion.

15. The vehicle drive device according to claim 14, the gear group that configures the differential gear mechanism is arranged on the axial first side with respect to the stator.

16. The vehicle drive device according to claim 1, wherein a counter gear mechanism for drivingly connecting the input member and the differential gear mechanism is arranged on a third axis different from the first axis and the second axis.

17. The vehicle drive device according to claim 1, wherein the shaft member is arranged on a lower side of the first axis and on an upper side of a lowermost portion of the rotary electric machine.

18. A vehicle drive device comprising:
a rotary electric machine including a stator on an outer side of a rotor in a radial direction;
an input member drivingly connected to the rotor;
a differential gear mechanism in which a drive force from the rotary electric machine that is transmitted via the input member is distributed to a first wheel and a second wheel; and
a case that accommodates the rotary electric machine, the input member, and the differential gear mechanism, wherein
the rotary electric machine and the input member are arranged on a first axis,
the differential gear mechanism is arranged on a second axis different from the first axis,
the input member and the differential gear mechanism include a part arranged on an axial first side that is one side in an axial direction with respect to the rotary electric machine,
an opposite side in the axial direction from the axial first side is set as an axial second side,
the differential gear mechanism is connected to the first wheel via a shaft member including a part that is arranged on the second axis on the axial second side with respect to the differential gear mechanism,
the case includes an outer peripheral support portion that is formed along a core outer peripheral surface that is an outer peripheral surface of a stator core included in the stator, and that supports the core outer peripheral surface in the radial direction,
the outer peripheral support portion is provided with an inner case that has a tubular inner peripheral surface surrounding the stator core from the outer side in the radial direction and that is externally fitted to the stator core, an outer case that is externally fitted to the inner case, and a flow passage that is formed between the inner case and the outer case and through which the coolant flows,
a notch portion in which the outer case is notched over an entire area of an arrangement area of the stator core in the axial direction is formed, and
the notch portion is arranged at a position that is between the core outer peripheral surface and the shaft member in the radial direction, and that overlaps the shaft member as seen in the radial direction along the radial direction.

19. The vehicle drive device according to claim 18, wherein an arrangement area of the shaft member in the radial direction overlaps an arrangement area of the flow passage in the radial direction.

20. A vehicle drive device comprising:
a rotary electric machine including a stator on an outer side of a rotor in a radial direction;
an input member drivingly connected to the rotor;
a differential gear mechanism in which a drive force from the rotary electric machine that is transmitted via the input member is distributed to a first wheel and a second wheel; and
a case that accommodates the rotary electric machine, the input member, and the differential gear mechanism, wherein
the rotary electric machine and the input member are arranged on a first axis, the differential gear mechanism is arranged on a second axis different from the first axis, the input member and the differential gear mechanism include a part arranged on an axial first side that is one side in an axial direction with respect to the rotary electric machine, an opposite side in the axial direction from the axial first side is set as an axial second side, the differential gear mechanism is connected to the first wheel via a shaft member including a part that is arranged on the second axis on the axial second side with respect to the differential gear mechanism, a stator core provided in the stator includes a main body portion that extends in the axial direction and that has a cylindrical shape, and a plurality of protruding portions protruding to an outer side in the radial direction with respect to the main body portion, the protruding portions are arranged so as to be dispersed in a circumferential direction along an outer peripheral surface of the main body portion, and are each fixed to a fixing portion formed in the case, and at least a part of the shaft member is arranged on an inner side in the radial direction with respect to a virtual circle passing through an outer side end of each of the protruding portions in the radial direction, as seen in the axial direction along the axial direction.

* * * * *